(12) United States Patent
Mori et al.

(10) Patent No.: US 6,507,712 B2
(45) Date of Patent: Jan. 14, 2003

(54) CAMERA

(75) Inventors: Ikko Mori, Hino (JP); Tetsuya Takagi, Akiruno (JP); Kazuki Sakurai, Hino (JP); Moriya Katagiri, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/970,517

(22) Filed: Oct. 4, 2001

(65) Prior Publication Data

US 2002/0044777 A1 Apr. 18, 2002

(30) Foreign Application Priority Data

Oct. 13, 2000 (JP) ...................................... 2000-314373
Oct. 13, 2000 (JP) ...................................... 2000-314374
Oct. 13, 2000 (JP) ...................................... 2000-314376

(51) Int. Cl.$^7$ ................................................. G03B 1/00
(52) U.S. Cl. ........................ 396/406; 396/387; 396/538; 396/415
(58) Field of Search ................................ 396/406, 407, 396/415, 512, 535, 538, 387, 404–410, 414

(56) References Cited

U.S. PATENT DOCUMENTS

| 4,870,437 A | 9/1989 | Omaki et al. |
| 4,939,531 A | 7/1990 | Sawamura et al. |
| 5,075,707 A | * 12/1991 | Shibayama et al. ......... 396/408 |
| 5,255,034 A | * 10/1993 | Shimada et al. ............ 396/406 |

FOREIGN PATENT DOCUMENTS

| JP | 62-215256 A | 9/1987 |
| JP | 63-164733 U | 10/1988 |
| JP | 2-69732 A | 3/1990 |
| JP | 2-41015 B2 | 9/1990 |
| JP | 6-235962 A | 8/1994 |
| JP | 7-69566 B2 | 7/1995 |

* cited by examiner

*Primary Examiner*—David M. Gray
*Assistant Examiner*—Michelle Nguyen
(74) *Attorney, Agent, or Firm*—Frishauf, Holtz, Goodman & Chick, P.C

(57) ABSTRACT

A camera in which a magazine can be loaded into a magazine chamber in the direction along a winding shaft thereof in a state in which a film leader is wound thereon. During such magazine loading, the film leader is inserted along the outer periphery of a film guide disposed in the magazine chamber. After the magazine has been loaded, the film leader is temporarily rewound into the magazine. Then, it is fed toward a spool chamber. The film leader that has reached the spool chamber is advanced by the spool and film loading is completed. By employing such a loading mechanism, it is possible to provide a camera incorporating a film loading mechanism with a simple structure which is capable of reliable film loading and making it possible, in cameras using 135-type film magazine, to load a magazine in the axial direction thereof.

39 Claims, 17 Drawing Sheets

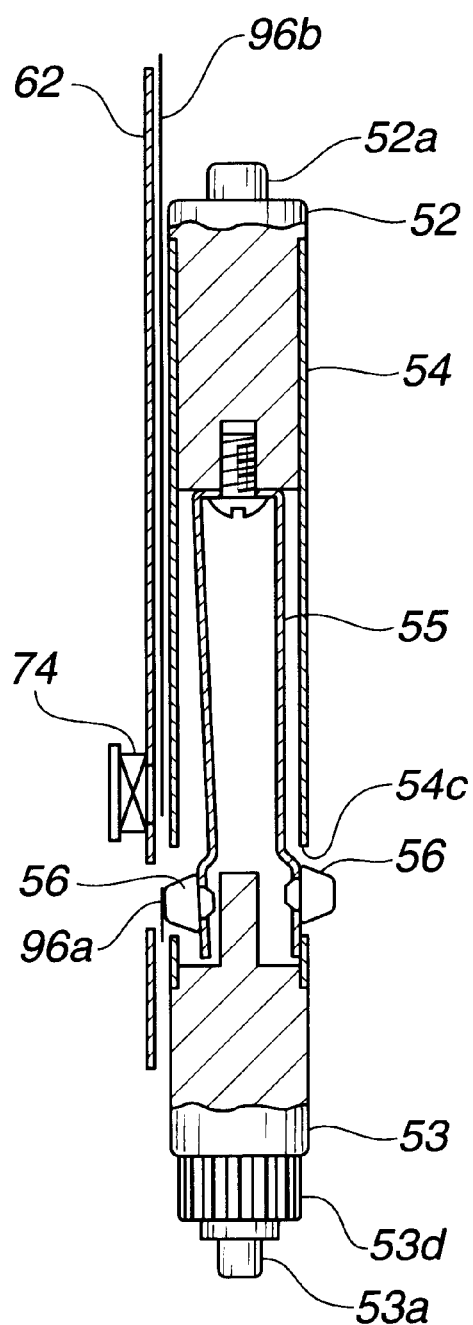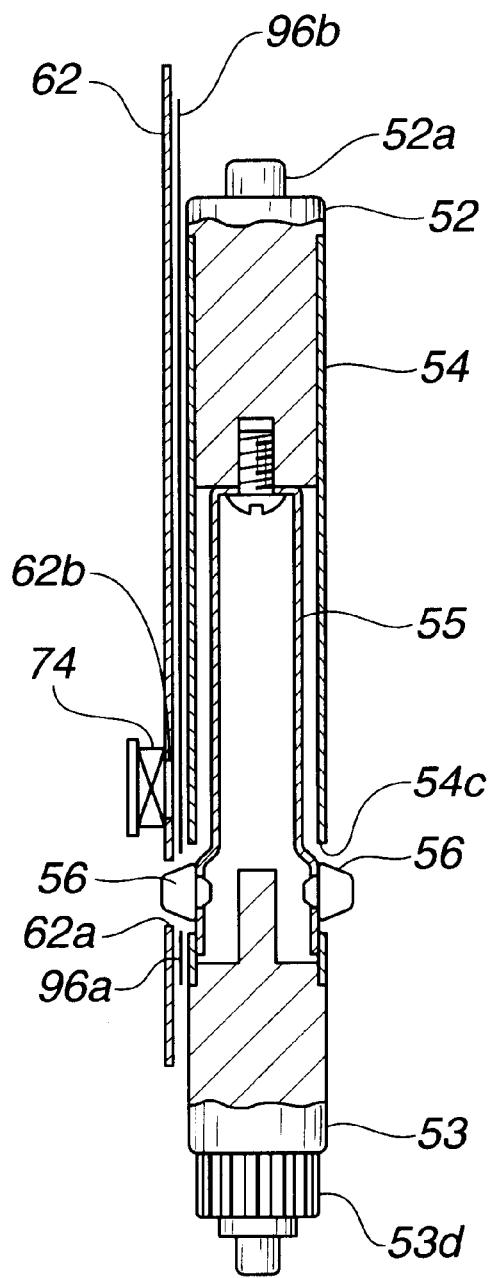

FIG.10A FIG.10B
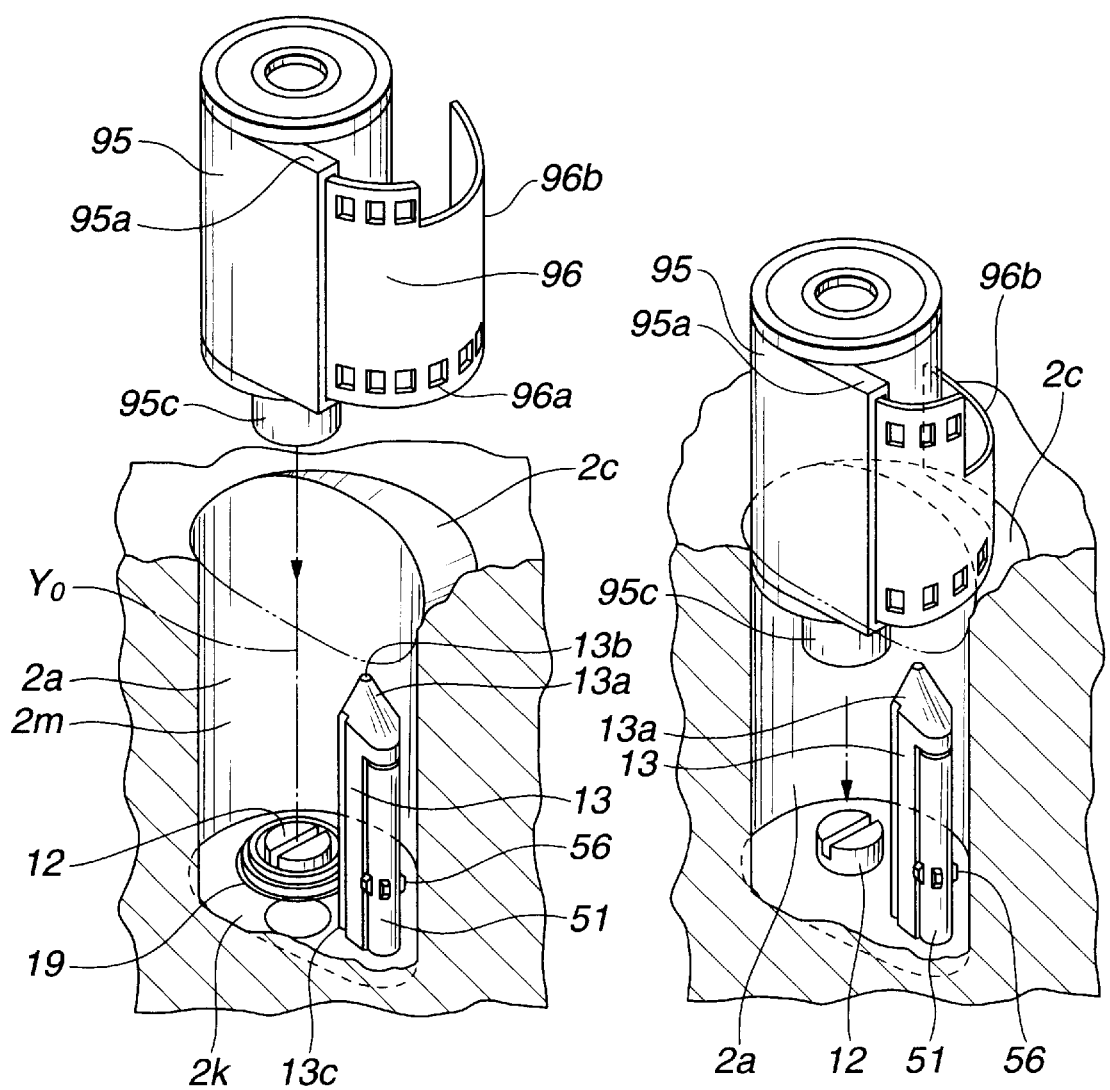

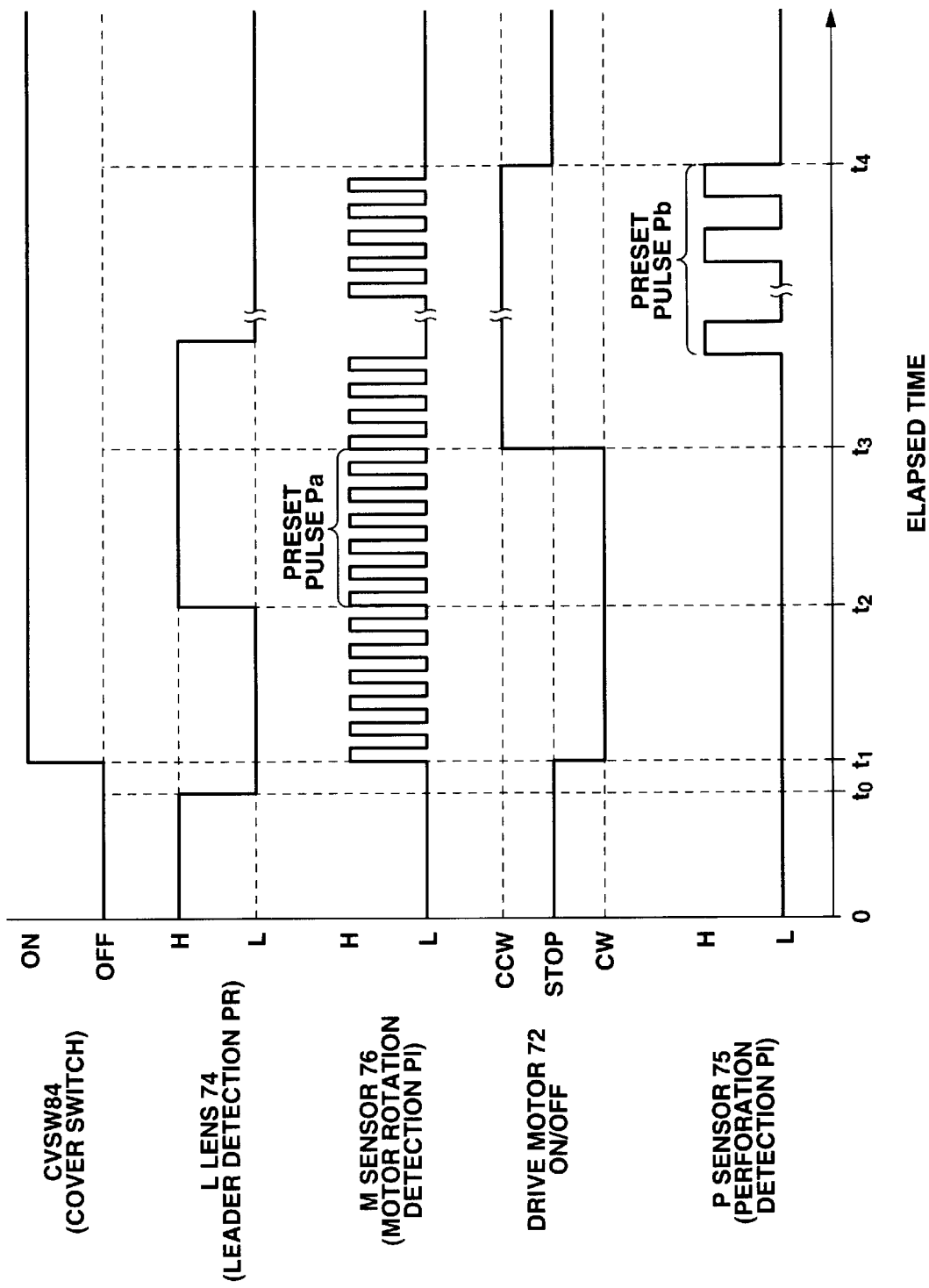

CAMERA

This application claims benefit of Japanese Applications Nos. 2000-314373, 2000-314374, 2000-314376 filed in Japan on Oct. 13, 2000, the contents of which are incorporated by this reference.

BACKGROUND OF THE INVENTION

1. Field of the Invention

The present invention relates to a structure and control for magazine loading and film supply in cameras.

2. Description of the Related Art

Some of the conventional cameras which employ a 135-type film magazine use a loading system in which the magazine can be loaded by simple insertion and the operation of setting a film leader into a spool chamber located in the camera is not required.

A camera which uses such a loading system is disclosed in Japanese Patent Application Laid-open No. H2-69732. In such a camera, after the magazine has been loaded, the winding shaft of the magazine is rotated in the rewinding direction and the length of the exposed portion of the film leader is decreased to a preset value. Then, the magazine itself is rotated from the loading position to a preset film supply position and the film tip is guided by a guide part into an exposure unit. As a result, the film can be reliably fed into the camera exposure unit even if the film tip is curled significantly.

However, the camera disclosed in the above-mentioned Japanese Patent Application Laid-open No. H2-69732 requires rotating the magazine after loading, the space taken by the magazine chamber is necessarily increased, and the camera body is increased in size. At the same size, the structure becomes complex because a mechanical unit is required for rotating the magazine.

In the camera disclosed in Japanese Patent Application Laid-open No. S62-215256, a magazine cover is opened and the magazine is loaded. The magazine cover is then closed in a state in which a film leader is exposed to the outside of the camera from an inlet opening. Once the exposed film leader has been pulled into the camera, the film is fed to a spool chamber via a supply path and assumes a shooting-ready state. In such camera, the film can be reliably loaded without paying much attention to the length of the exposed film leader.

However, in the camera disclosed in the above-mentioned Japanese Patent Application Laid-open No. S62-215256, the film leader is exposed to the outside of the camera immediately after the magazine has been loaded and this leader is pulled into the camera, which is inconvenient. Furthermore, in an ordinary shooting state, the film inlet opening is exposed on the camera, which is undesirable in terms of light leakage and waterproofing, and also from the standpoint of appearance.

Furthermore, in the camera employing the above-described loading system, which was disclosed in Japanese Patent Application Laid-open No. S63-164733, a magazine with an exposed film leader is loaded by insertion from the axial direction between a camera body and a rear cover opened to a preset angle. In such camera, the film loading is started and the film is set in a shooting-ready state when the rear cover is closed.

However, in the camera disclosed in the above-mentioned Japanese Patent Application Laid-open No. S63-164733, when the magazine is loaded into the camera body, the film leader has to be inserted into the gap between the rear cover and camera body in an extended state thereof. Therefore, the film leader is difficult to insert into the gap and the camera is inconvenient to use. Furthermore, the film leader has to be inserted so as to avoid interference with the sprocket catches located in the camera body. Accordingly, the size of the spool chamber is increased which makes it difficult to reduce the dimensions of the camera.

The invention disclosed in Japanese Patent Application Laid-open No. H6-235962 which provides a structure surrounding a magazine chamber of a camera relates to a camera employing a magazine of a type in which the entire film leader is contained inside the magazine body. In such camera, the film feed surface in the film feed opening of the magazine is inclined at a preset angle to the film pressure plate surface. Such an arrangement makes it possible to eliminate the unnecessary space between the magazine chamber and the side wall of the camera body surrounding the light path and the decrease the width of the camera.

However, the camera disclosed in the above-mentioned Japanese Patent Application Laid-open No. H6-235962 cannot employ a magazine of the type which includes an exposed film leader, to which the present invention pertains, but the aforesaid conventional camera uses a structure in which, as described above, the film is fed in a tilted state thereof and is directly led onto the film rail surface. Therefore, the film could be damaged by the rail surface. Furthermore, sometimes the film became loose in the vicinity of the inlet portion of the rail surface and the film flatness was difficult to maintain. In order to prevent loosening of the film in the vicinity of the inlet portion of the rail surface, it was necessary to incorporate a separate film control means.

SUMMARY OF THE INVENTION

The present invention was created to resolve the above-described problems and it is an object of the present invention to provide a camera in which loading of the magazine from an axial direction thereof and loading of film can be reliably conducted and which has a simple structure.

A camera in accordance with the present invention comprises:

a magazine chamber into which the magazine can be inserted in the direction of the winding shaft in a state in which a film tip exposed to the outside thereof is wound thereon, a rod-like film guide which is disposed inside the magazine chamber and is inserted between the magazine and the film tip that is exposed to the outside of the magazine when the magazine is loaded into the magazine chamber, a rewinding mechanism comprising a fork engageable with one end of the winding shaft of the magazine and driving the fork so as to wind the film tip into the magazine, a feed mechanism comprising a sprocket forming a part of the film guide and driving the sprocket so as to feed the film tip toward a spool, a wind-up mechanism comprising the spool disposed on the opposite side of the camera with respect to the magazine chamber so as to sandwich a shooting orifice therebetween and driving the spool so as to advance the film fed by the driving operation of the feed mechanism, and a control circuit for controlling the supply of the film, wherein the control circuit drives the rewinding mechanism so as to rewind a portion of the film tip into the magazine, terminates the rewinding operation once the film tip has been rewound to a preset position, and then drives the feed mechanism so as to feed the film tip toward the spool.

Other features and advantages of the present invention will become evident from the following description.

BRIEF DESCRIPTION OF THE DRAWINGS

FIG. 4A is a cross-sectional view at E—E in the below-described FIG. 12 illustrating the film guide and the surrounding of a sprocket unit for film feeding in the camera of the embodiment illustrated by FIG. 1, this view illustrating a state in which the sprocket catch is pushed by the film leader in the process of film leader insertion during magazine loading;

FIG. 4B is a cross-sectional view at E—E in the below-described FIG. 12 illustrating the film guide and the surrounding of a sprocket unit for film feeding in the camera of the embodiment illustrated by FIG. 1, this view illustrating a state in which the sprocket catch is engaged with the perforation of the film leader and the film leader insertion is completed in the process of film leader insertion during magazine loading;

FIG. 10A is a perspective view illustrating a state prior to magazine loading in the process of magazine loading into the magazine chamber in the camera of the embodiment illustrated by FIG. 1;

FIG. 10B is a perspective view illustrating a state in the course of magazine loading in the process of magazine loading into the magazine chamber in the camera of the embodiment illustrated by FIG. 1;

FIG. 21 is a time chart of the film loading process in the camera of the embodiment illustrated by FIG. 1.

DESCRIPTION OF THE PREFERRED EMBODIMENT

The preferred embodiments of the present invention will be described below with reference to the drawings.

Figure 1:
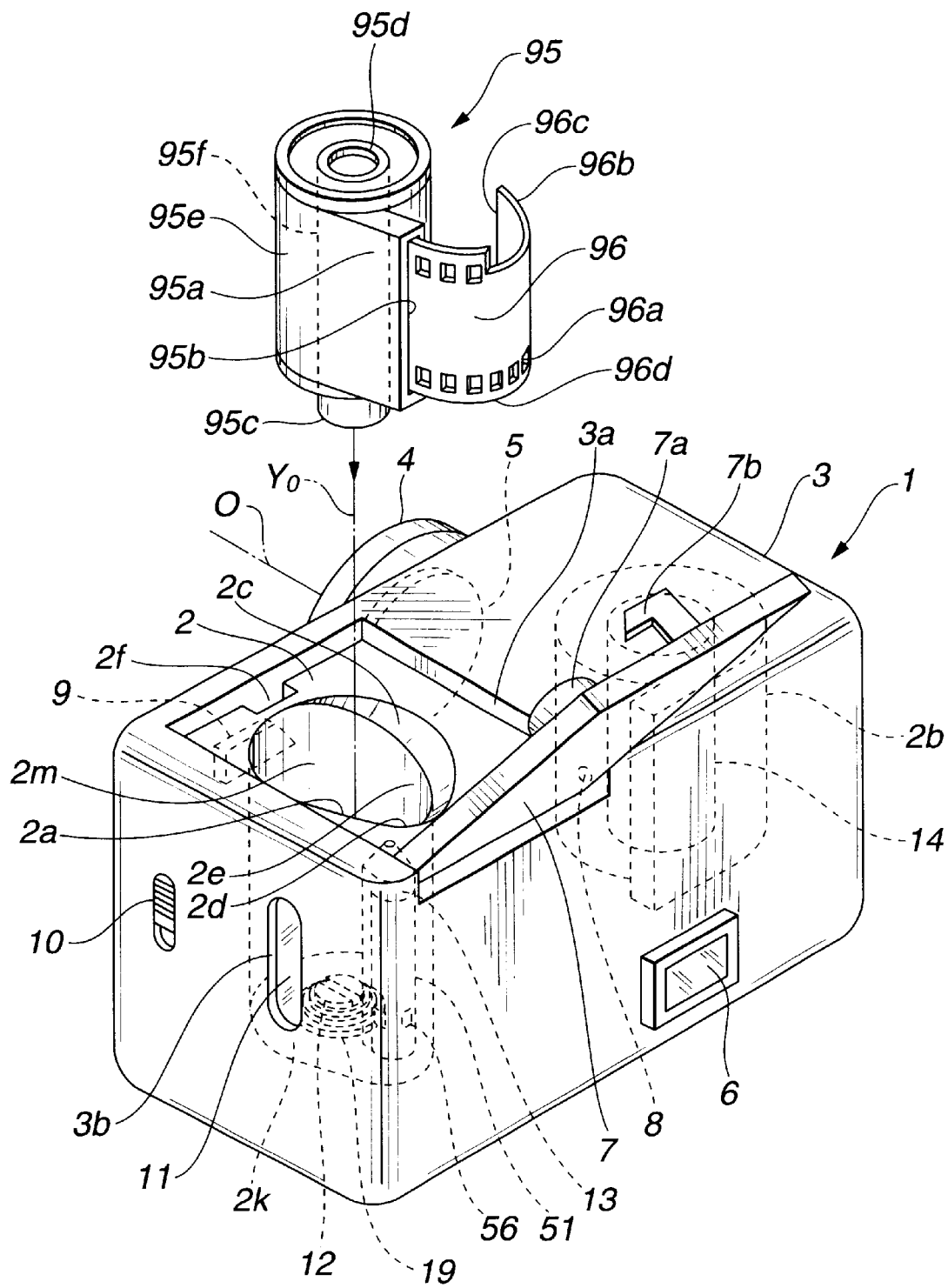
FIG. 1 is a perspective view of a camera from a bottom surface side thereof, this view illustrating an embodiment of the present invention.
Figure 2:
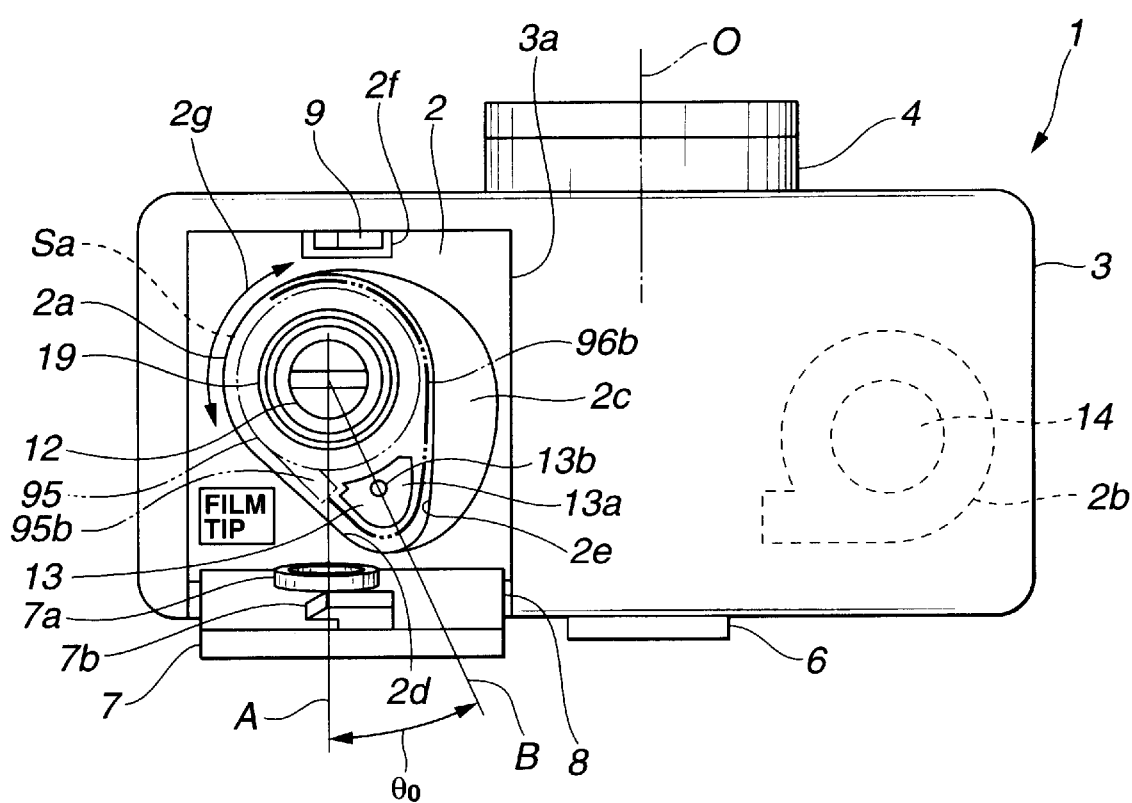
FIG. 2 is a bottom surface view of the camera of the above-mentioned embodiment illustrating a state in which a magazine chamber cover is opened. The magazine loading state is shown by a two-dot-dash line.

A camera 1 which is an embodiment of the present invention comprises a camera body 2 and a camera case 3 which encloses the camera body 2, as shown by a perspective view in FIG. 1 and a bottom view in FIG. 2.

Figure 18:
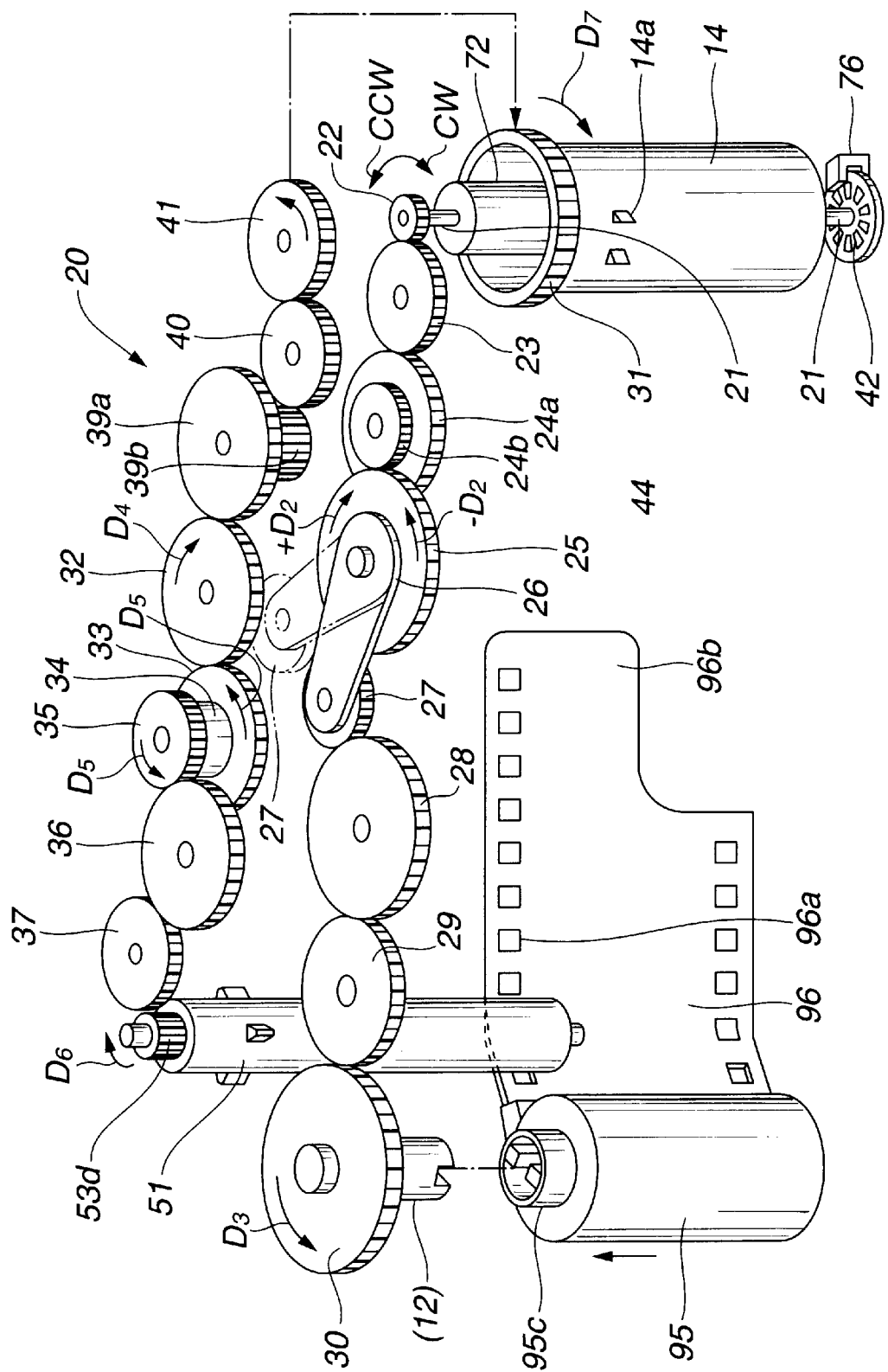
FIG. 18 is a perspective view, as viewed from the camera upper surface, illustrating the configuration of a film supply drive system in the camera of the embodiment illustrated by FIG. 1.

The camera body 2 mainly comprises a lens barrel 4 containing a camera lens 5, a finder optical system (not shown in the figures), a film guide 13 which is a film guiding member and a part setting the rotation direction and position of the magazine (magazine rotation blocking member), a sprocket unit 51 which is a feed mechanism supported by the film guide 13, a light-shielding unit 16 (see FIG. 6) of a magazine display, a mask plate 61 (see FIG. 15) having a rail (not shown in the figure) guiding the film and an aperture orifice 61a, a film pressure plate (referred to as a pressure plate hereinbelow) 62 (see FIG. 15), and a film supply drive system 20 (see FIG. 18).

Furthermore, the camera body 2 is provided with a magazine chamber 2a into which a magazine 95 can be loaded, a spool chamber 2b incorporating a spool 14 for advancing a film, and a display opening 2h in a position facing a magazine display window 11.

The camera case 3 mainly comprises a viewfinder window 6, a release button (not shown in the figures), a rewind button (not shown in the figures), a power switch button (not shown in the figures), a magazine chamber cover 7 that can be opened and closed, a magazine display window 11 fixedly mounted in a magazine display opening 3b, and a cover release knob 10.

Magazine 95 comprises a magazine winding shaft (winding shaft) 95f having a 135-type (according to JIS) film 96 wound thereon, a magazine case 95e, a feed opening protrusion 96a having a film feed opening 95b, a long hub 95c, and a short hub 95d. Magazine 95 can be loaded into the magazine chamber 2a from the side of long hub 95c in a state in which a film leader 96b (described hereinbelow) is wound onto the case 95e. The position of the magazine during loading is such that magazine winding shaft 95f is along the Y0 direction (described hereinbelow).

Film 96 is provided with perforation 96a along its entire length and is wound and held on the magazine winding shaft 95f. Film leader 96b which is the end portion of film 96 is exposed to the outside of the magazine from the magazine feed opening 95b when the magazine is loaded. The tip of film leader 96b is denoted as a leader tip 96c, and the film lateral end surface at the long hub side thereof is denoted as a lateral end surface 96d.

The magazine chamber 2a comprises a cylindrical inner wall surface 2m where magazine 95 is loaded, a wall surface 2d serving as the first feed opening wall, a wall surface 2e serving as the second feed opening wall, a film guide tilted surface 2c formed in the inlet opening of magazine chamber 2a and serving as a first guide of film leader 96b during magazine loading, and a magazine chamber bottom surface 2k. Magazine chamber 2a is composed of a cylindrical space formed by cylindrical inner wall surface 2m and a space formed by an almost triangular column composed of wall surfaces 2d, 2e. Furthermore, wall surface 2d is inclined to the optical axis O, and wall surface 2e is provided along the side surface of lens barrel 4 and almost parallel to the optical axis O.

Cylindrical inner wall surface 2m is a part of a cylindrical surface having as a central axis a Y0 axis which is a parallel axis on a plane (plane in the vertical direction of camera body 2) which is almost perpendicular to the optical axis 0 of camera lens 5. Furthermore, this cylindrical surface is larger than the case 95e of magazine 95, has a film insertion gap Sa (space for film leader), and makes it possible to insert the film leader 96b in a state in which it is wound on the magazine case 95e.

Wall surfaces 2d, 2e have an almost V-like shape and are connected to the inner wall surface 2m; they are parallel to the Y0 direction.

Film guide tilted surface 2c is provided to facilitate sliding of lateral end surface 96d of film leader 96a toward the cylindrical inner wall surface 2m and wall surfaces 2d, 2e during magazine 95 loading. This tilted surface 2c is formed by a conical curved surface (concave conical surface) tilted to the magazine chamber bottom surface 2k toward the Y0 axis center. The range where this tilted surface 2c is provided starts almost from the end portion of cylindrical inner wall surface 2m at the side of the front surface of camera body and reaches the wall surface 2d via the wall surface 2e.

At the magazine chamber bottom surface 2k, a fork 12 which is a rewinding mechanism for rotating the magazine winding shaft 95f and a magazine removal spring 19 for applying force in the direction of removal of the loaded magazine 95 are disposed in respective positions on the Y0 axis. The fork 12 can be connected to a spline of long hub 95c of the loaded magazine 95.

Furthermore, film guide 13 serving as a second film guide and sprocket unit 51 serving as a film feed mechanism are disposed above the magazine chamber bottom surface 2k in the positions at the inner side of wall surfaces 2d, 2m.

Magazine chamber cover 7 is rotatably supported on camera case 3 via support shaft 8. A magazine hub support protrusion 7a rotatably supporting the magazine 95 and fit into the magazine short hub 95d, and a cover closure locking catch 7b are provided at the magazine chamber cover 7 at the magazine chamber side thereof.

In a closed state of magazine chamber cover 7, the cover closure locking catch 7b is inserted into a catch orifice 2f of the camera body, engaged with a latch 9 located inside the camera body, and maintains the closed state of magazine chamber cover 7. If the cover closure locking catch 7b is engaged with latch 9, a CVSW (cover switch) 84 of cover detection means disposed in the vicinity of the latch is turned ON (see FIG. 19). In the closed state of the cover, the outer periphery of magazine chamber cover 7 is mated with cover orifice 3a of camera case 3 and the light-tight state of magazine chamber 2a is maintained.

Magazine chamber cover 7 can be opened by sliding a cover release knob 10 provided at the side surface of camera case 3 and releasing the engagement of latch 9. When the cover is released, the loaded magazine 95 is protruded upward by the spring 19, which makes it possible to remove the magazine 95 easily.

Film guide 13 and sprocket unit 51 for film feed assume erecting positions in the direction parallel to the Y0 axis in the space formed by an almost triangular column bounded by a cylindrical periphery at the extension of cylindrical inner wall surface 2m, wall surface 2d, and wall surface 2e. Film guide 13, as described below, has a tilted surface 13a forming a substantially circular cone surface in the upper portion thereof, as a vertex 13b thereof, as shown in FIG. 2, is located on a straight line B that makes an angle θ0 with a straight line A parallel to the optical axis O and that is closer to the optical axis O than the straight line A.

Sprocket unit 51 is rotatably supported inside the film guide 13, as described below, and is positioned so as to be separated by a film insertion gap Sc from the surface of pressure plate 62 at the magazine chamber side thereof.

Figure 3A:
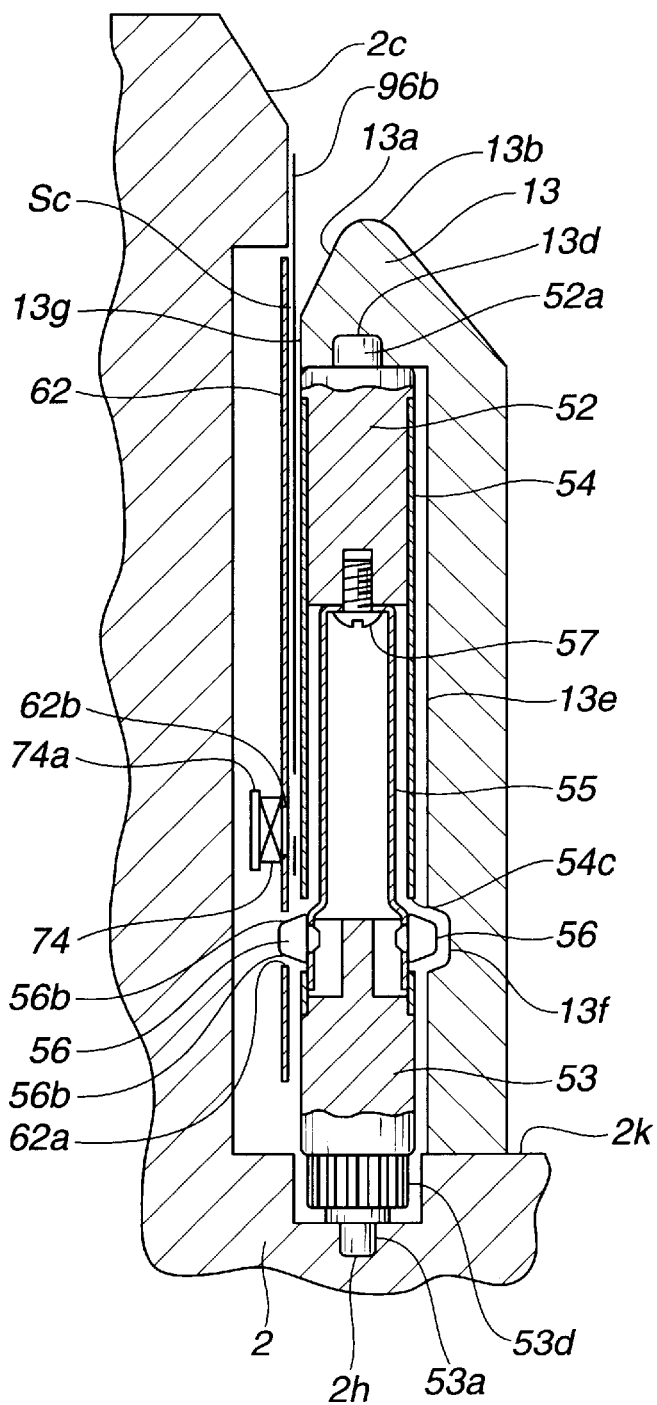
FIG. 3A is a cross-sectional view at E—E in the below-described FIG. 12 illustrating the film guide and the surrounding of a sprocket unit for film feeding in the camera of the embodiment illustrated by FIG. 1, this view illustrating the initial state of film leader insertion in the process of film leader insertion during magazine loading.

Film guide 13 is fixedly disposed on the bottom surface 2k of magazine chamber 2a, as shown by a cross-sectional view in FIG. 3A, and has a substantially triangular columnar shape with a tip tilted surface 13a substantially in the shape of a circular cone having vertex 13b at the orifice side of magazine chamber 2a.

Figure 12:
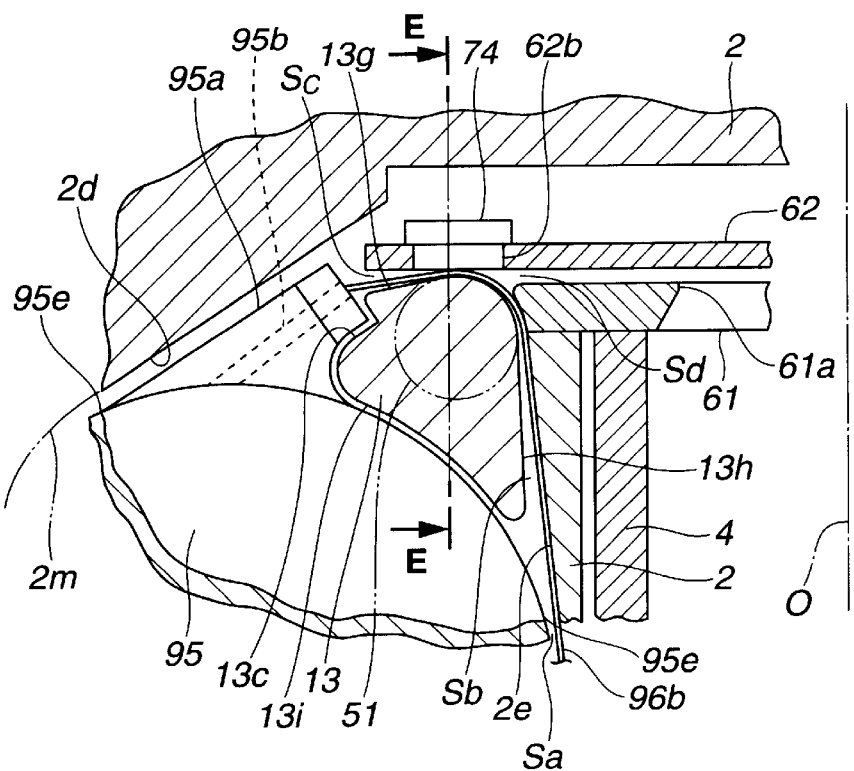
FIG. 12 is a partial expanded cross-sectional view, as viewed from the camera upper surface, of the surrounding of the film inlet opening and film guide after magazine loading in the camera of the embodiment illustrated by FIG. 1, this view illustrating a state in which the film leader is still exposed immediately after the magazine loading.

Furthermore, film guide 13, as shown by a lateral sectional view in FIG. 12, has an outer wall surface 13g which is the first side surface (first film leader guide) forming the film insertion gap Sc (space for film leader), an outer wall surface 13h which is the second side surface (second film leader guide) forming film insertion gap Sb (space for film leader) opposite the wall surface 2e of magazine chamber, a cylindrical inner wall surface 13i facing the case 95e of inserted magazine, and a notched portion (rotation controlling portion, position setting portion) 13c opposite the wall surface 2d of magazine chamber.

The film insertion gap Sc is formed opposite the wall surface 2d of magazine chamber and a front end (straight portion connecting the film feed opening 95b of loaded magazine and a film inlet opening Sd which is a film gate) of pressure plate 62.

Film feed opening protrusion 95a of magazine 95 which is to be loaded can be fit into the space (space for feed opening) formed by the wall surface 2d of the magazine chamber and notched portion 13c, and because of such fitting of protrusion 95a, rotation of magazine 95 around the winding shaft 95f in the loaded state of the magazine can be controlled and the loaded position of magazine 95 can be maintained. Furthermore, the film feeding direction of feed opening 95b of magazine 95 which is in the above-mentioned loaded position is along the outer wall of film guide 13 and is tilted at a preset angle with respect to pressure plate 62 toward the film inlet opening Sd.

The space formed by notch 13c and magazine chamber wall surface 2d in which the feed opening protrusion 95a of magazine 95 is fit is inclined at a preset angle with respect to a plane perpendicular to the optical axis O. Therefore, the space in the left-right direction taken by the magazine chamber 2a decreases corresponding to this inclination.

Figure 13:
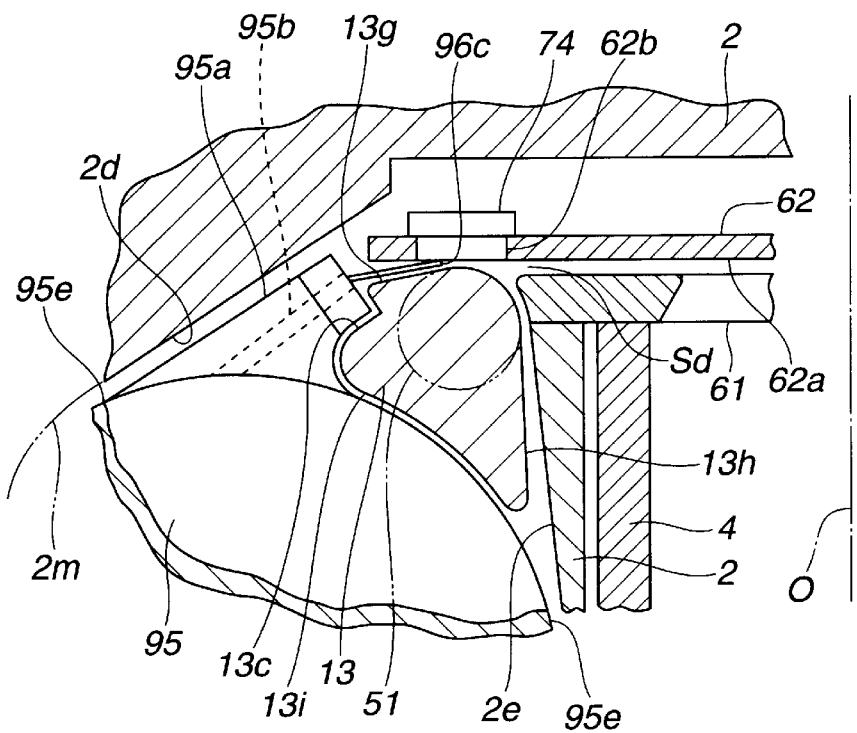
FIG. 13 is a partial expanded cross-sectional view, as viewed from the camera upper surface, of the surrounding of the film inlet opening and film guide after magazine loading in the camera of the embodiment illustrated by FIG. 1, this view illustrating a state in which the tip of the film leader was rewound to a preset position in front of an L sensor.

Tip tilted surface 13a of film guide 13 at the side of outer wall surfaces 13g, 13h functions, in cooperation with magazine chamber tilted surface 2c, a guide for guiding the film leader 96b of magazine 95 into magazine chamber 2a when it is inserted thereto. Furthermore, outer wall surface 13g together with pressure plate 62 functions, as shown in FIG. 13, as a guide guiding the film leader 95b of loaded magazine 95 from the film feed opening 95b to the film inlet opening Sd (a gap formed by the pressure plate 62 and mask plate 61) which is a film gate.

Furthermore, the tip tilted surface 13a of film guide 13 at the side of cylindrical inner wall surface 13i serves as a guide surface when magazine 95 is loaded into magazine chamber 2a by insertion into the space formed by feed opening protrusion 95a of magazine 95, magazine case 95e, and film leader 96b wound around the case thereof. Moreover, cylindrical inner wall surface 13i functions as a positioning member for case 95e of the loaded magazine 95.

On the other hand, a recess 13e containing sprocket unit 51, a bearing 13d supporting the sprocket shaft, and run off 13f for a sprocket catch are provided, as shown in FIG. 3A, inside the film guide 13.

Figure 5:
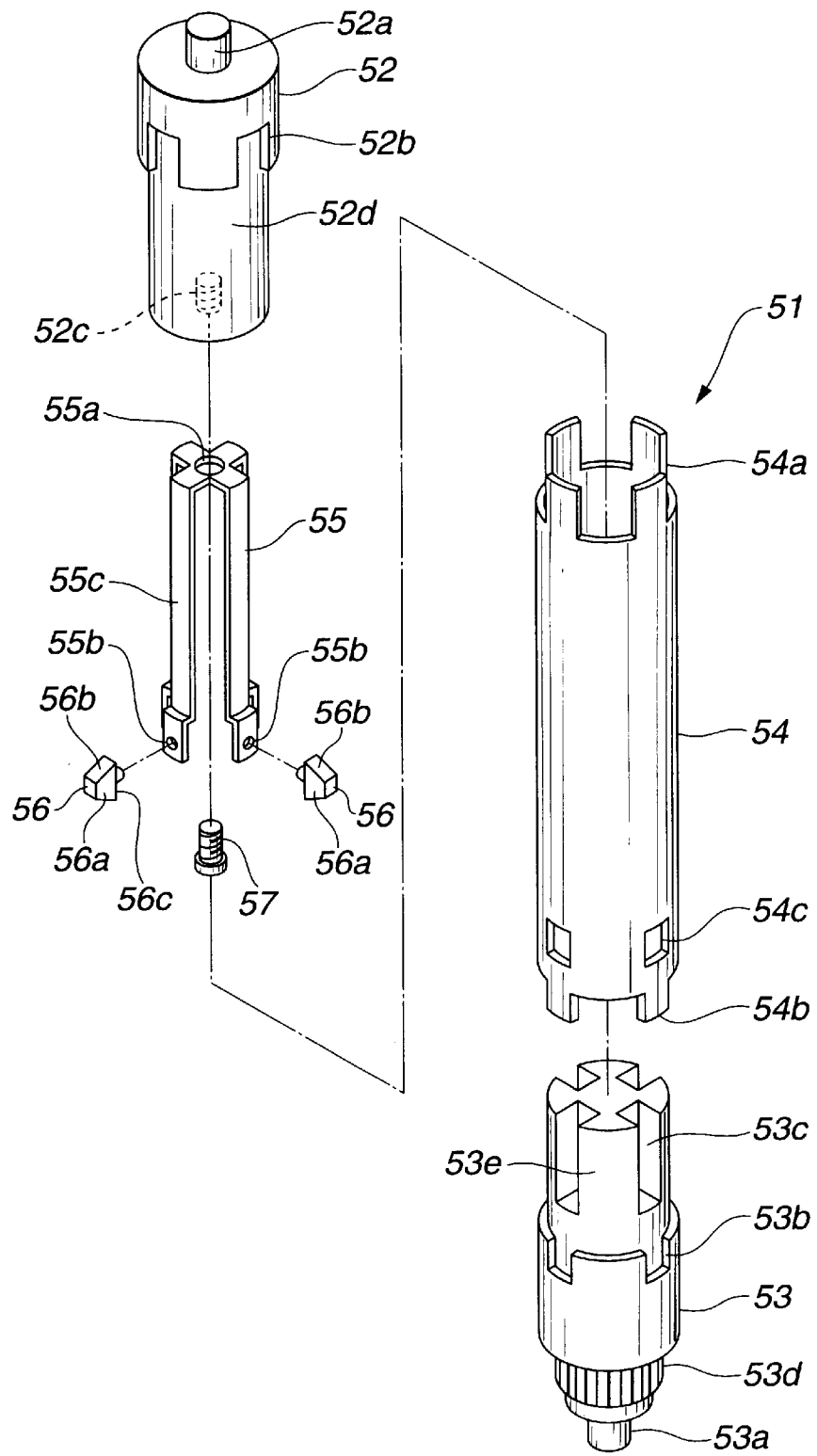
FIG. 5 is an exploded perspective view of the sprocket for film feeding incorporated in the camera of the embodiment illustrated by FIG. 1.

The sprocket unit 51 is composed of a sprocket driving shaft 53, a sprocket driven shaft 52, a sprocket tube 54, a catch spring 55, and four sprocket catches 56, are shown by an exploded perspective view in FIG. 5.

The sprocket driving shaft 53 is provided with a support shaft 53a mating with bearing 2h of camera body 2, a sprocket gear 53d, recesses 53b mating with sprocket tube protrusions 54b, a run off 53c of catch spring 55, and a shaft body 53e.

The sprocket driven shaft 52 is provided with a support shaft 52a mating with bearing 13d of film guide 13, recesses 52b fit onto sprocket tube protrusions 54a, a threaded hole 52c, and a shaft body 52d.

The sprocket tube 54 is provided with engaging protrusions 54b mating with recesses 53b of the sprocket driving shaft, engaging protrusions 54a mating with recesses 52b of the sprocket driven shaft, and catch holes 54c for fitting the sprocket catches 56 therein and removing them therefrom.

The catch spring 55 comprises legs 55c having a spring function and capable of elastic deformation resulting in extension in the axial direction, catch installation holes 55b provided in the end portions of the legs, and a screw insertion hole 55a. The catch spring 55 is secured to sprocket driven shaft 52 with a screw 57 in threaded hole 52c.

The sprocket catch 56 is provided with a pair of perforation mating surfaces 56a on the left and right surfaces in the rotation direction, a pair of tilted surfaces 56b on the upper and lower surfaces in the axial direction, and an installation pin 56c. The sprocket catch 56 is secured to catch installation hole 55b of catch spring 55.

If a film end surface or perforation is brought in contact, from the axial direction, with the tilted surface 56b of sprocket catch 56 and applies pressure thereto, the catch spring 55 undergoes elastic deformation via the catch 56. Under the effect of the elastic deformation, the sprocket catch 56 is retracted into catch hole 54c of sprocket tube, and the film end surface or film perforation can move over the sprocket tube.

However, in a state in which the sprocket catch 56 is fit into perforation 95a and rotated around the axis, the catch spring 55 is not deformed and the sprocket catch 56 is not retracted.

The sprocket driving shaft 53, sprocket tube 54, and sprocket driven shaft 52 having the catch spring 55 secured thereto are integrated by inserting shaft bodies 52d, into the tubular portion of sprocket tube 54 and securing therein or fitting without a clearance. In such integrated state, the sprocket catches 56 are maintained in a state in which they protrude from catch holes 54c of sprocket tube 54. The outer surface of sprocket tube 54 is treated to provide it with high light reflectance and fully reflects light from L sensor 74.

The sprocket unit 51 having the above-described configuration is rotatably supported by film guide 13 and bearings 13d, 2h of magazine chamber bottom surface 2k and assembled therewith, as shown by a cross-sectional view in FIG. 3. In such assembled state, the sprocket unit 51 is disposed so that the outer surface of sprocket tube 54 is in contact with the extended surface of outer wall surfaces 13h, 13g of film guide 13, as shown by a lateral sectional view in FIG. 12.

A gear 37 of a feed drive system of the below-described film supply drive system 20 is engaged with sprocket gear 53d of sprocket unit 51. Furthermore, as shown by cross-sectional view of FIG. 3, the pressure plate 62 is provided with a notch 62a obtained by cutting out a portion corresponding to the rotation path of sprocket catch 56 in a position facing the sprocket catch 56. Furthermore, an L sensor 74 which is PR (photoreflector) for position detection to detects the film leader tip 96c and an opening 62d therefor are disposed above the notch 62a. The L sensor 74 is supported by a flexible printed board 74a.

Figure 6:
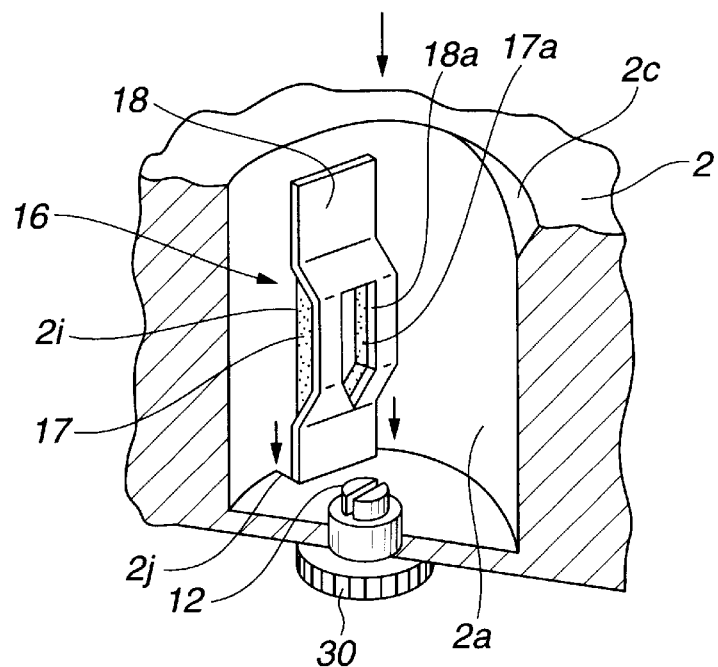
FIG. 6 is a perspective view illustrating the surrounding of a light-shielding unit constituting a magazine display unit located inside the magazine chamber in the camera of the embodiment illustrated by FIG. 1.
Figure 7:
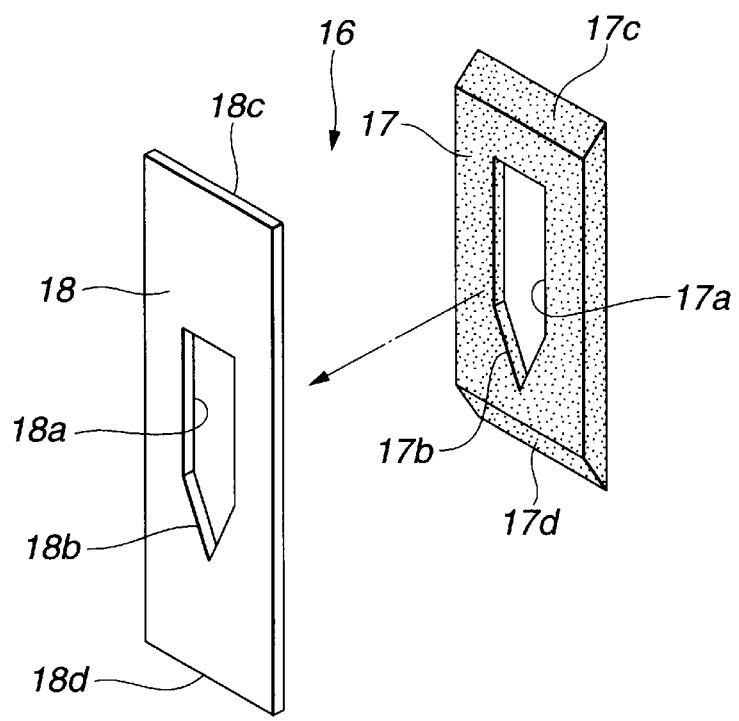
FIG. 7 is an exploded perspective view of the light-shielding unit of the magazine display unit in the camera of the embodiment illustrated by FIG. 1.

The light-shielding unit 16 is disposed inside the display opening 2h of magazine chamber 2a, as shown in FIGS. 6, 7, and is composed of a light shielding member 17 formed of a spongy material that can be elastically compressed and a flexible sheet member 18 formed of a thin-film part having good sliding properties.

An orifice 17a is provided in the central portion of light shielding member 17 and tilted surface 17c, 17d are provided in the upper and lower portions thereof. An orifice 18a is provided in the central portion of sheet member 18. The orifice 17a and 18a have tilted sides such that the orifices 17b, 18b are gradually more narrow toward the magazine chamber bottom surface 2k. Such decrease in the width of the orifices in the insertion direction prevents the end surface portion 95g of magazine 95 from being hooked with the orifices 17b, 18b when a compressive force is applied by case 95e during magazine insertion.

Figure 8:
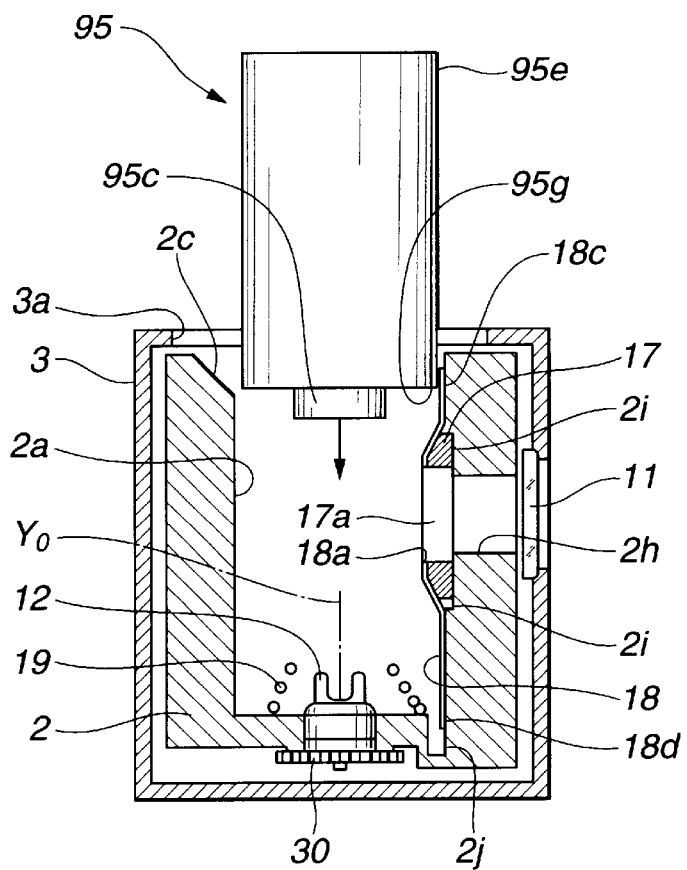
FIG. 8 is a longitudinal sectional view of the camera of the embodiment illustrated by FIG. 1 (cross-sectional view at C—C in the below-described FIG. 15), this view illustrating the initial state of magazine loading when the magazine is loaded into the magazine chamber.

On the other hand, a display opening 2h passing through the magazine chamber inner wall surface 2d is provided in the position of the camera body facing the magazine display window 11, as shown by a cross-sectional view in FIG. 8. A recess 2i for installation of the light shielding member is provided on the magazine chamber inner wall surface 2d of display opening 2h.

The light shielding member 17 is fit and installed in recess 2i, and a gap is provided between the light shielding member 17 at the magazine chamber bottom surface side thereof and a recess 2j, this gap serving as a run off during compression of light shielding member 17.

The end portion 18c of sheet member 18 at the magazine insertion side thereof is adhesively bonded and secured to the magazine chamber inner wall surface 2d. The central portion thereof is adhesively bonded to light shielding member 17, and the front end portion 18d at the magazine chamber bottom portion 2k is installed without adhesive bonding so as to be inserted in the run-off groove 2j provided in the bottom portion 2k. Light shielding member 17 can move slightly downward when magazine 95 compresses the light shielding member 17 via the sheet member 18 without contact with the recess 2i but inside thereof.

Figure 15:
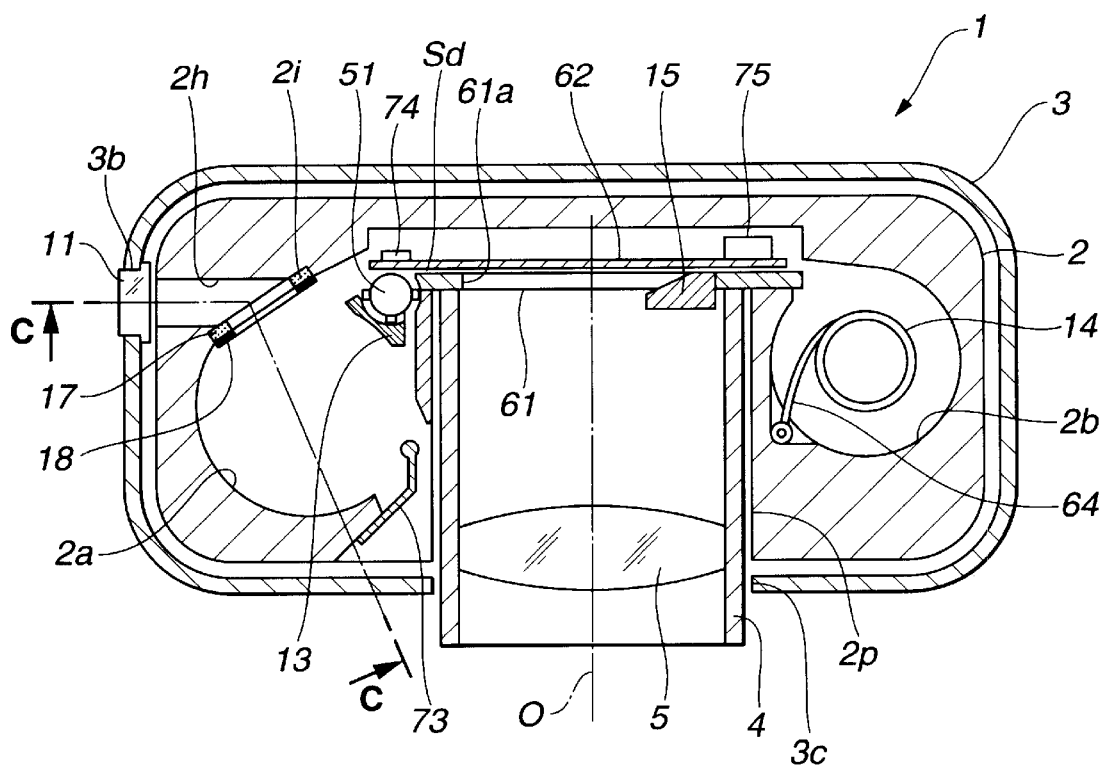
FIG. 15 is a lateral sectional view of the camera of the embodiment illustrated by FIG. 1, as viewed from the camera upper surface, this view illustrating a state prior to magazine loading.

The above-described mask plate 61 and pressure plate 62 are disposed at the image-forming surface side of camera lens barrel 4, as shown by a cross-sectional view in FIG. 15. Mask plate 61 is provided with an aperture orifice 61a. A gap between mask plate 61 and pressure plate 62 serve as a film supply path going from magazine chamber 2a to spool chamber 2b. The end portion of the film supply path at the magazine chamber side is a film inlet opening Sd.

An L sensor 74 of PR (photoreflector) serving as film tip detection means is on pressure plate 62 in a position opposite the sprocket unit 51, and a P sensor 75 of PR (photoreflector) detecting the passage of film perforation 96a is disposed at the end portion of pressure plate 62 at the spool chamber 2b side thereof.

Furthermore, as shown by a cross-sectional view in FIG. 15, a movable block 15 is provided in the end portion of aperture orifice 61a of mask plate 61 at the spool chamber 2b side thereof. The movable block 15 is guide means for preventing the tip 96c of the supplied film leader 96b from being entangled in the camera tube. This block is linked to forward and reverse movement of camera lens barrel 4.

Thus, when the lens barrel 4 is in a retracted position (or position in which shooting is not conducted), the movable block 15 is positioned, as shown in FIG. 15, inside the aperture orifice 61a of mask 61. However, when the tube 4 is drawn out through the orifice 2p, 3c for tube into a shooting position, the movable block 15 is retracted to the outside of the optical path according to the movement of the tube.

Furthermore, a DX contact tab 73 formed by an electric contact tab that can be elastically deformed in the radial direction is disposed on the cylindrical inner wall surface 2m, as shown by a cross-sectional view in FIG. 15, in the magazine chamber 2a of camera body 2. When the magazine 95 is inserted, the DX contact tab 73 is brought in contact with magazine case 95e and a DX code can be read. The output of DX contact tab 73 is also used as a magazine insertion detection signal.

A film guide plate 64 that can move under the effect of a weak force toward spool 14 is disposed in spool chamber 2b of camera body 2. The film guide plate 64 has a function of winding a film 96 onto spool 14 when the film 96 is supplied into the spool chamber 2b. Spool 14 has a plurality of catches 14a, pulls the film perforation 96a, and winds the film onto the spool.

The film supply drive system 20, as shown by a perspective view in FIG. 18, comprises a drive source containing a drive motor 72, a switch drive system (switch mechanism) composed of a planetary gear mechanism such as a sun gear 25 or the like, a rewinding drive system (rewinding mechanism) composed of a fork gear 30 or the like, a one-way clutch 34, a feed drive system (feed mechanism) composed of a sprocket gear 53d or the like, and an advancing drive system (wind-up mechanism) composed of a spool gear 31.

A drive motor 72 comprises a motor shaft 21 protruding at both ends thereof. A motor pinion 22 and an encoder plate 42 are secured to respective axial ends of the motor shaft 21. The rotation of motor pinion 22 is transmitted to a sun gear 25 via a gear 23, and a large gear 24a and a small gear 24b of a two-stage gear system. The rotation of encoder plate 42 is detected by M sensor 76 composed of a photointerrupter (PI).

The above-mentioned planetary gear mechanism is composed of a sun gear 25, a carrier 26, and a planetary gear 27. The carrier 26 is rotatably supported on the shaft of sun gear 25, and planetary gear 27 is engaged with sun gear 25 rotatably supported by carrier 26. Therefore, when sun gear 25 rotates in the +D2 direction, the carrier 26 also rotates in the +D2 direction. As a result, planetary gear 27 becomes engaged with gear 32. If sun gear 25 rotates in the −D2 direction, the carrier 26 also rotates in the −D2 direction. As a result, the planetary gear 27 becomes engaged with gear 28.

The rewinding drive system comprises a gear 28, a gear 29, and a fork gear 30 supported on a fork 12. The rotation of gear 28 is transmitted to fork 12 via gear 29.

The feed drive mechanism comprises a one-way clutch drive-side gear 33 engaged with a gear 32, a one-way clutch 34, a one-way clutch driven-side gear 35, a gear 36, a gear 37, and a sprocket gear 53d.

When the drive-side gear 33 rotates in the D5 direction (state in which the film is fed by sprocket unit 51), the one-way clutch 34 is in a coupled state, the rotation of drive-side gear 33 is transmitted to a driven-side gear 35 and sprocket gear 53d is rotated in the D6 direction. Furthermore, when the sprocket gear 53d is rotated with a higher speed and the driven-side gear 35 is rotated in the D5 direction faster than the drive-side gear 33 (state in which the film is advanced by spool 14), the coupling of one-way clutch 34 is released and the drive-side gear 33 and driven-side gear 35 rotate independently.

The advancing drive system comprises gear 32, a large gear 39a and a small gear 39b of a two-stage gear system, a gear 40, a gear 41, and a spool gear 31 provided on spool 14. The rotation of gear 32 in the D4 direction is transmitted to spool gear 31 via the above-mentioned gear.

During film rewinding operation in the above-described film supply drive system 20, the drive motor 72 rotates in a clockwise direction (CW direction), rotating the sun gear 25 of the planetary gear mechanism in the −D2 direction. Because of the rotation of sun gear 25 in the −D2 direction, the planetary gear 27 is engaged with gear 28 (first state) and fork gear 30 is rotated in the D3 direction via gear 28. Because of such rotation of fork gear 30, the winding shaft 95f of inserted magazine 95 is rotated in the D3 direction and film 96 is rewound inside the magazine.

Furthermore, during film feed operation, the drive motor 72 rotates in a counterclockwise direction (CCW direction) and the sun gear 25 of the planetary gear mechanism is rotated in the +D2 direction. Because of such rotation of sun gear 25 in the +D2 direction, the planetary gear 27 is engaged with gear 32 (second state), and drive-side gear 33 is rotated in the D5 direction via gear 32. This rotation is transmitted to the driven-side gear 35 via the one-way clutch 34 and the sprocket gear 53d is rotated in the D6 direction. Because of the rotation of sprocket gear 53d, the sprocket unit 51 is rotated in the D6 direction and the film 96 is fed to spool 14 via sprocket clutches 56 and perforation 96a. At this time, the spool gear 31 also simultaneously rotates in the D7 direction.

Furthermore, when the film is advanced, the drive motor 72 rotates in a counterclockwise direction (CCW direction), and the sun gear 25 of the planetary gear mechanism is rotated in the +D2 direction. Because of such rotation of sun gear 25 in the +D2 direction, the planetary gear 27 is engaged with gear 32 (second state) and gear 32 is rotated in the D4 direction. The rotation of gear 32 is transmitted to spool gear 31 and spool 14 is rotated in the D7 direction.

At this time, if the leader 96b of film 96 reaches the spool 14 owing to the above-described film feed operation, the film 96 will be advanced to spool 14 rotating in the D7 direction.

The speed at which film 96 is advanced to spool 14 during the above-described film advancing is set by the gear drive system so as to be higher than the speed of sprocket unit 51 driven via the one-way clutch 34. Sprocket unit 51 is rotated in the D6 direction by the advancing film 96 via perforation 96a.

The rotation speed of one-way clutch driven-side gear 35 in the D5 direction at this time is higher than the rotation speed of one-way clutch drive-side gear 33, which is driven via gear 32, in the D5 direction. Therefore, the coupling of one-way clutch 34 is released and the feed drive system, including sprocket unit 51, is driven via the film, without impediments.

Figure 19:
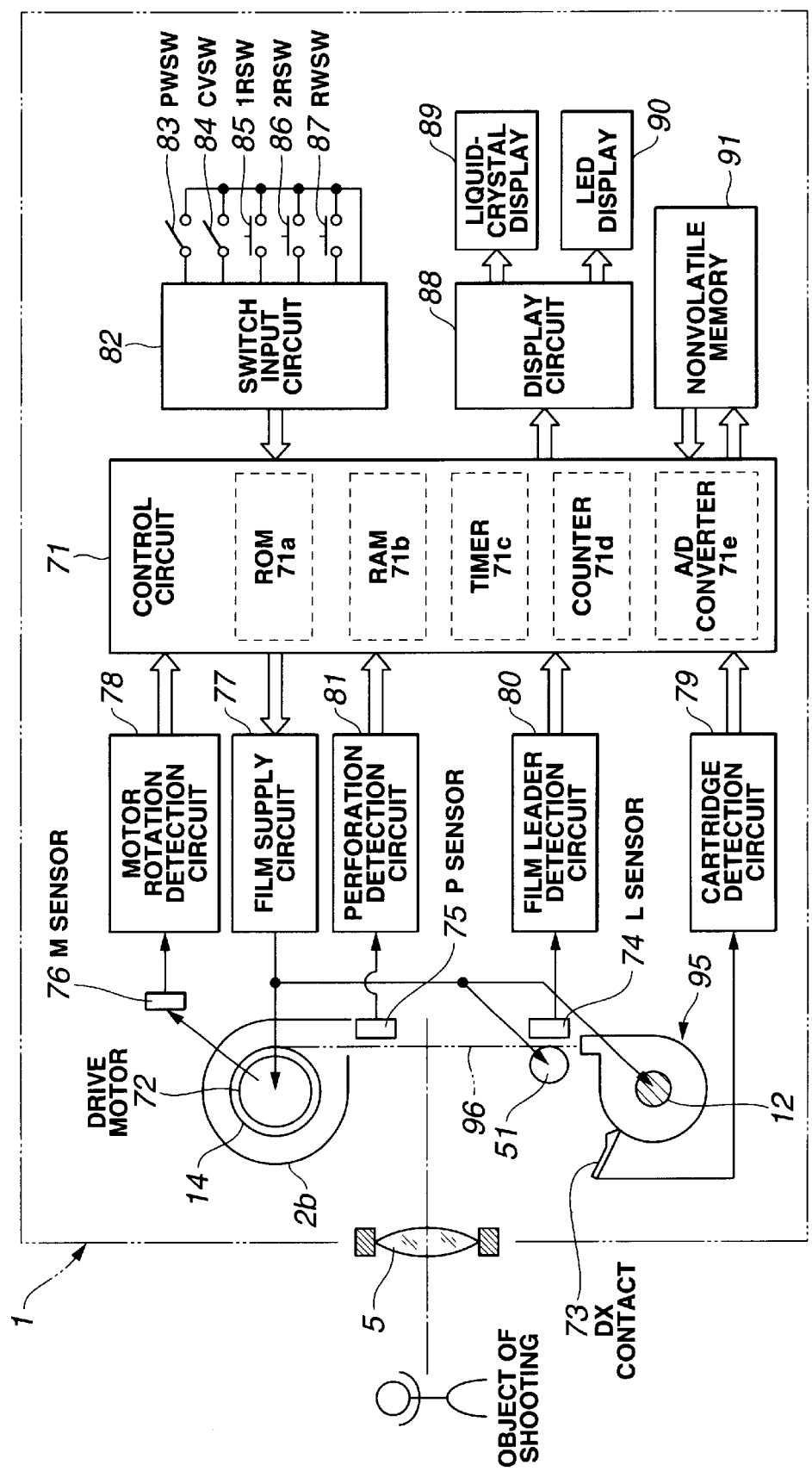
FIG. 19 is a block diagram of the electric control system in the camera of the embodiment illustrated by FIG. 1.

The configuration of the electric control system of camera 1 of the present embodiment will be described hereinbelow with reference to a block diagram of the electric control system shown in FIG. 19.

Camera 1 of the present embodiment comprises therein a CPU 71 which is a control circuit employed to control the entire camera, a drive motor 72 for film supply and direct and reverse driving of the lens barrel, an M sensor 76 which is a PI (photointerrupter) detecting the amount of rotation of drive motor 72, an L sensor 74 which is a PR (photoreflector) as film front end detection means for detecting the position of film leader tip 96c, a DX contact tap 73 which is a sensor for reading the DX code of the loaded magazine 95 and also functions as magazine loading detection means, a P sensor 75 which is a PR (photoreflector) for detecting the amount of supply of film 96 by the passage of perforation 96a, a motor rotation detection circuit 78 which picks up the output of M sensor 76 and outputs the motor rotation amount signal to CPU 71, a magazine detection circuit 79 which picks up the output from DX contact tap 73 and outputs the magazine loading signal to CPU 71, a film leader detection circuit 80 which picks up the output of L sensor 74 and outputs a film leader tip position detection signal to CPU 71, a perforation detection circuit 81 which picks up the output of P sensor 75 and outputs the film movement amount signal to CPU 71, and a film supply circuit 77 for driving the drive motor 72 based on the film supply output of CPU 71.

Furthermore, the camera 1 also comprises therein a PWSW (power switch) 83 which is a power source switch, a CVSW (cover switch) 84 which is cover detection means for detection of a closed state of magazine chamber cover, a 1RSW (release first-stage switch) 85 which is turned on by the first-stage operation of the release knob, a 2RSW (release second-stage switch) 86 for exposure initiation which is turned on by the second-stage operation of the release knob, a RWSW (rewind switch) 87 for indicating the proceeding rewinding of the film, a switch input circuit 82 for picking up the output of the above-described group of switches and producing an output to CPU 71, a display circuit 88 for receiving the display information from CPU 71, a liquid-crystal display unit 89 and a LED display unit 90 driven by display circuit 88 for displaying the above-mentioned display information, and a non-volatile memory 91.

The CPU 71 comprises therein a ROM 71a for storing a processing program for controlling various control elements in the camera, a RAM 71b for storing data for shooting, a timer circuit 71c, a counter circuit 71d, an A/D converter circuit 71e and so on.

The display circuit 88 receives information display signals such as shooting mode information, film counter information, and date information or an information display signal of a strobo state and displays that information on liquid-crystal display unit 89 and LED display unit 90.

Furthermore, the nonvolatile memory 91 stores various shooting conditions or setting information for setting the shooting conditions. For example, even though the battery is replaced, the nonvolatile memory resets the formerly set shooting conditions.

In the camera of the above-described embodiment having the above-described structure, the magazine 95 having an exposed film leader 96b is loaded into the magazine chamber 2a. Autoloading of the film is conducted after this insertion. Thus, the film leader 96b is rewound into the magazine, while only a tip thereof is left outside. Then, the film leader 96b is fed toward the spool chamber 2b and advanced by spool 14, thereby completing the film loading. Those autoloading operations are fully controlled by CPU 71 serving as a control circuit.

Figure 11A:
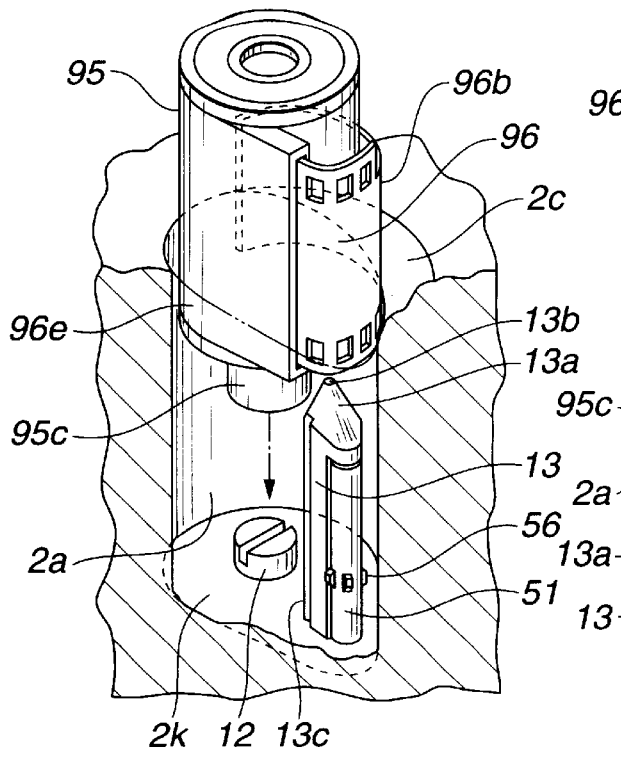
FIG. 11A is a perspective view illustrating a state in the course of magazine loading in the process of magazine loading into the magazine chamber in the camera of the embodiment illustrated by FIG. 1.
Figure 16:
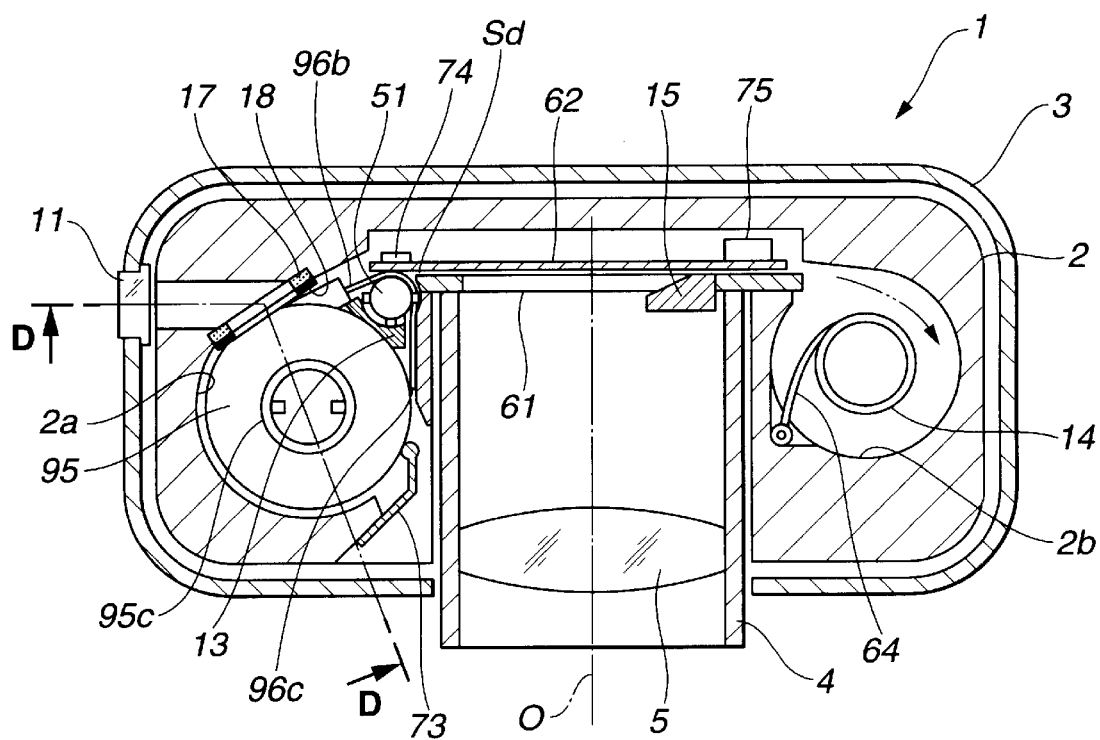
FIG. 16 is a lateral sectional view of the camera of the embodiment illustrated by FIG. 1, as viewed from the camera upper surface, this view illustrating a state in which the film leader is wound in after the magazine loading.

The film loading operation starting from the loading operation will be described below based on the flow chart of autoloading shown in FIG. 20 and a time chart shown in FIG. 21. The loading process will be described with reference to cross-sectional views in FIGS. 3 and 4 and a perspective view in FIG. 11, and the film loading process will be described with reference to partial cross-sectional views in FIGS. 12~14 and cross-sectional views in FIGS. 15~17.

When magazine 95 is loaded, the magazine chamber cover 7 of camera case 3 is released by operating the cover release button 10 in a state in which the PWSW 83 serving as a power source switch is turned on and the camera bottom surface faces upward. At this time, the L sensor 74 projects light onto sprocket tube 54, receives the reflected light and assumes an H mode. As shown in FIGS. 10A, B, the magazine is inserted into magazine chamber 2a along the Y0 axis from the long hub 95 side thereof. The insertion of magazine 95 into magazine chamber 2a proceeds, while the film lateral end portion 96d of film leader 96b is caused to slide over the guide tilted surface 2c, as shown in FIG. 10B. The tip 96c of film leader 96b on the magazine case should be positioned within the range of allowed range mark 2g on camera body 2 (see FIG. 2).

Figure 11B:
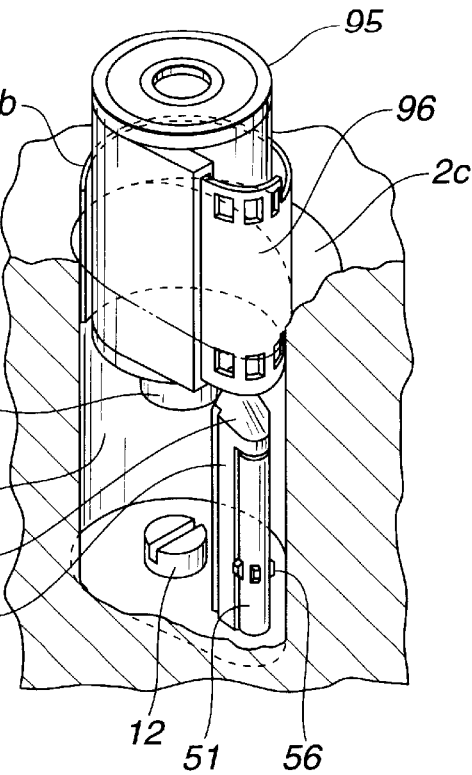
FIG. 11B is also a perspective view similarly illustrating a state in the course of magazine loading in the process of magazine loading into the magazine chamber in the camera of the embodiment illustrated by FIG. 1.
Figure 11C:
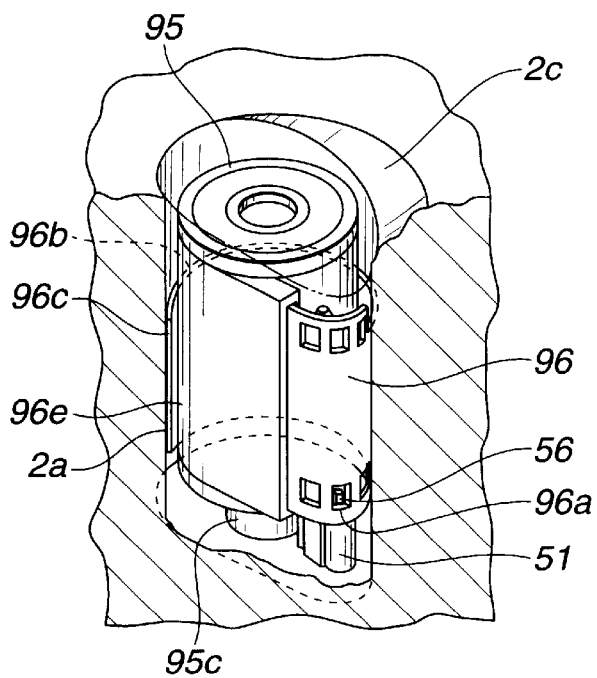
FIG. 11C is a perspective view illustrating a magazine loading completion state in the process of magazine loading into the magazine chamber in the camera of the embodiment illustrated by FIG. 1.

Furthermore, if magazine 95 is inserted into magazine chamber 2a, the film leader 96b, as shown in FIG. 11B and FIG. 12, is inserted into the gap Sc between the pressure plate 62 and the outer wall surface 13g of film guide 13, gap Sb between the magazine chamber wall surface 2e and the outer wall surface 13h of film guide 13, and gap Sa between the magazine chamber cylindrical inner wall surface 2m and magazine case 95e, while sliding over the film guide tilted surface 2c and/or inclined surface 13a of film guide 13. A cross-sectional view in FIG. 3A illustrates a state in which the film leader 95b is inserted into the gap Sc between the pressure plate 62 and the outer wall surface 13g of film guide 13.

At the same time, the feed opening protrusion 95a of magazine 95 is inserted, while being guided between the magazine chamber wall surface 2d and notched portion 13c of film guide 13.

If now the magazine chamber cover 7 is closed, the catch 7b is hooked with latch 9 and a cover closed state is assumed. The magazine 95 is positioned at the short hub 95d side thereof by the hub support protrusion 7a and, at the same time, inserted to the preset loading position at the magazine chamber bottom surface side.

Figure 20:
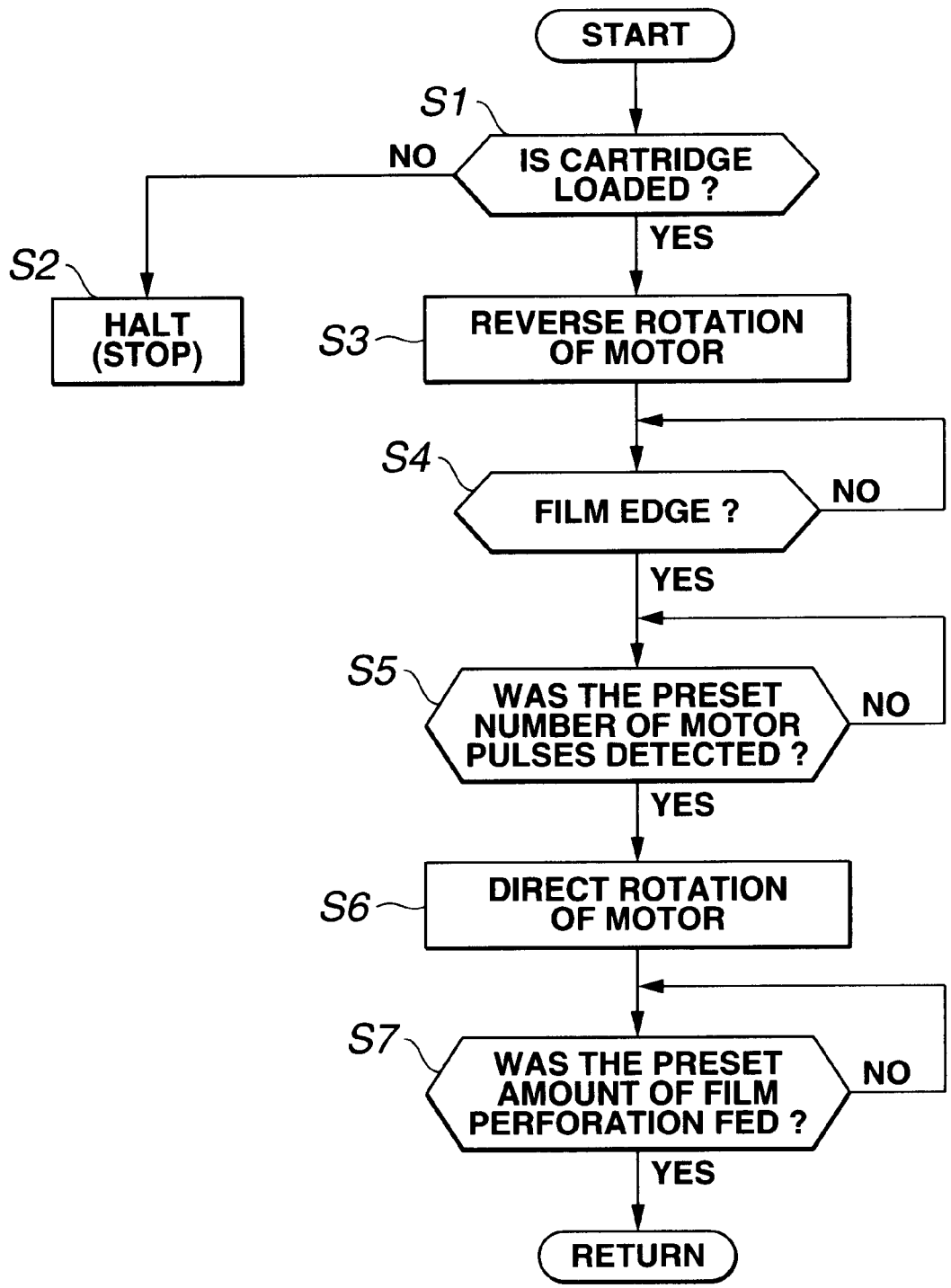
FIG. 20 is a flow chart of the film loading process in the camera of the embodiment illustrated by FIG. 1.

If the magazine chamber cover 7 assumes, as described above, a closed state, a cover closure signal is output from CVSW 84 for cover closed state detection and autoloading described below with reference to FIG. 20 is started.

Figure 3B:
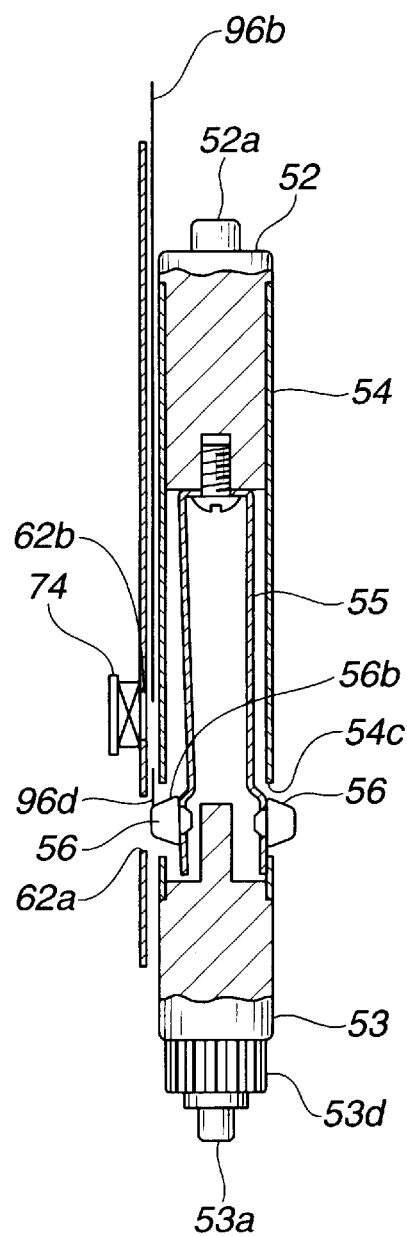
FIG. 3B is also a cross-sectional view at E—E in the below-described FIG. 12 illustrating the film guide and the surrounding of a sprocket unit for film feeding in the camera of the embodiment illustrated by FIG. 1, this view illustrating a state in which the film leader is brought in contact with a sprocket catch in the process of film leader insertion during magazine loading.

If the lateral end portion 96d of film leader 96b is brought in contact with the tilted surface 56b of sprocket catch 56 of sprocket unit 51, as shown in FIG. 3B, in the above-described magazine insertion process, the catch spring 55 undergoes elastic deformation, sprocket catch 56 is retracted into the sprocket tube 54 as shown in FIG. 4A, and the film leader 96b can move over the sprocket tube 54.

When magazine 95 is inserted to a preset loading position in magazine chamber 2a, the perforation 96a of film 96 is fit onto sprocket catch 56, as shown in FIG. 4B, FIG. 1C, and FIG. 12. Furthermore, the magazine long hub 95c is joined to fork 12.

Depending on the position of film 96 in the feed direction, the perforation 96a and sprocket catch 56 may be displaced and, naturally, no insertion occurs. This state, however, corresponds to the insertion and formation of a joined state in the below-described initial rewinding process of film leader 96b. Similarly, depending on the rotation position of fork,12, the magazine long hub 95c and fork 12 do not necessarily assume an engaged state. This state, however, corresponds to the insertion and formation of engaged state in the below-described initial rewinding process of film leader 96b.

In the loaded state, the feed opening protrusion 95a of magazine 95 is inserted between the magazine chamber wall surface 2d and notched portion 13c of film guide 13 and the rotation of the magazine 95 around the winding shaft 95f is controlled. Furthermore, the film leader 96b is maintained in a state in which it is inserted into gap Sc with the pressure plate 62, gap Sb with the magazine chamber wall surface 2e, and gap Sa with the magazine chamber cylindrical wall surface 2m.

Figure 9:
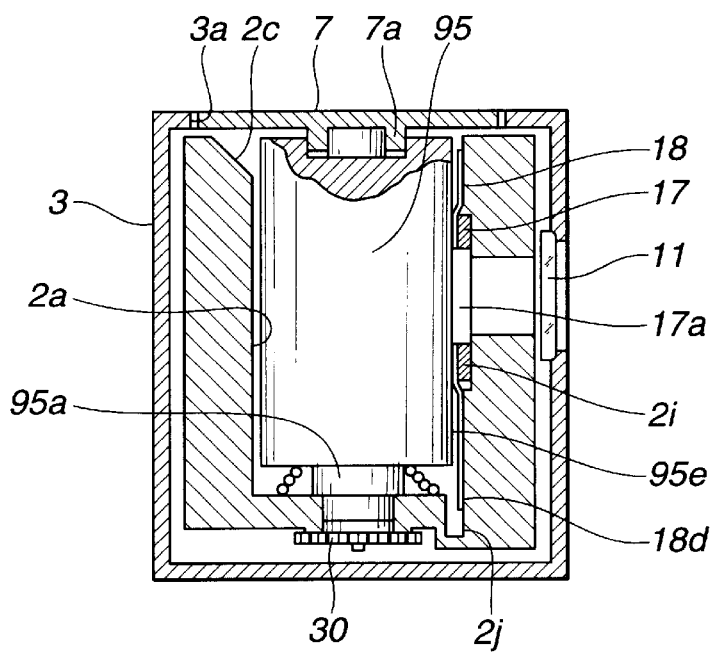
FIG. 9 is a longitudinal sectional view of the camera of the embodiment illustrated by FIG. 1 (cross-sectional view at D—D in the below-described FIG. 16), this view illustrating a state in which the magazine is loaded into the magazine chamber.

Furthermore, in the inserted state of magazine 95, as shown by cross-sectional views in FIGS. 8, 9, the magazine case 95e moves toward the magazine chamber bottom surface 2k, while sliding over the sheet 18 of light-shielding unit 16, and causes compression deformation of light shielding member 17 via the sheet 18. Therefore, a state is assumed in which light from magazine display window 11 is completely shielded by light shielding member 17 and no external light penetrates into the magazine chamber 2.

Further, in the above-described compression process, since the magazine case 95e moves on the sheet 18 bonded to the tilted surface of light shielding member 17 while compressing the light shielding member 17, the front end 18d of sheet 18 moves along the magazine chamber surface direction, while being guided inside the sheet run-off groove 2j.

As described above, if the magazine chamber cover 7 is closed after the insertion of magazine 95, the CVSW 84 for cover closed state detection outputs a cover closure signal, this signal is picked up by CPU 71, the current process is suspended, and autoloading illustrated by FIG. 20 is initiated.

First, in step S1, the magazine insertion state is checked. Thus, a signal from DX contact tab 73 is picked up by magazine detection circuit 79, the insertion detection output is picked up by CPU 71, and the insertion of magazine 95 is verified. If the fully inserted state is not attained, for example, if the magazine chamber cover 7 is closed without the insertion of magazine, the routine jumps to step 2 and a HALT state is assumed, that is, CPU 71 is maintained in a power-saving state in which processing is terminated and a stand-by state is attained.

Actually, if the magazine chamber cover 7 is closed, the magazine 95 immediately assumes a fully loaded position and the loaded detection output is produced. Therefore, the routine immediately proceeds for step S3. In the time chart shown in FIG. 21, the loading detection signal is output almost exactly at the point in time t1 when the magazine chamber cover 7 was closed and the CW direction drive of drive motor 72 in step S3 is initiated. Furthermore, since the film leader 96b is detected by L sensor 74, following the insertion of magazine 95, at the point in time t0 preceding the point in time t1 on the time chart, the detection output becomes an L (low level) signal.

In step S3, the reverse rotation (CW direction rotation) of drive motor 72 is started. Following this rotation, the planetary gear 27 of planetary gear mechanism is engaged with gear 28 and the fork gear 30 is rotated in the D3 direction. Because of the rotation of fork gear 30 in the D3 direction, the winding shaft 95f of magazine 95 is rotated in the rewinding direction, initiating rewinding of the exposed film leader 96b into the magazine 95. In the course of this rewinding, the sprocket unit 51 can rotate freely and is driven and rotated by film perforation 96a. Therefore, the movement of the drive systems is not impeded and such events as film movement termination or perforation rupture do not take place.

When the film leader tip 96c reaches the L sensor 74 position at the point in time t2 on the time chart shown in FIG. 21 in the rewinding process, an H (high level) signal is output from L sensor 74.

If the film edge (film tip 96c) arrival is detected by the changes in output of the L sensor 74 in step S4, the routine proceeds to step S5, the count of the number of output pulses of M sensor 76 is started in counter 71d and the output of the preset number Pa of pulses is checked.

If the output of the preset number Pa of output pulses is detected in step S5, the routine proceeds to step S6. Thus, when, after the arrival of film edge, a state is assumed in which the film leader 96b is almost straightly exposed from the film feed opening 95b, as shown by a cross-sectional view in FIG. 13, that is, the preset winding is conducted (in this state, the sprocket catch 56 still maintains the state of engagement with perforation 96a), the routine proceeds to step S6, and the rotation direction of drive motor 72 is switched to the positive rotation direction (CCW direction).

On the time chart shown in FIG. 21, the detection of the number Pa of output pulses and the below described switching of the rotation direction of drive motor 72 to the CCW direction is conducted at the point of time t3.

In step S6, the drive motor 72 is switched to a positive rotation direction (rotation in the CCW direction), as also shown on the time chart in FIG. 21. Following this rotation in the CCW direction, the planetary gear 27 of planetary gear mechanism is switched to engagement with gear 32. Gear 32 rotates in the D4 direction and the sprocket gear 53d is rotated in the D6 direction via one-way clutch 34. The rotation of gear 32 in the D4 direction is also transmitted to spool gear 31, and the spool 14 is simultaneously rotated in the D7 direction.

If the sprocket gear 53d rotates in the D6 direction, the sprocket unit 51 rotates in the same direction and the film reader 96b exposed from the film feed opening 95b is fed from the state shown in FIG. 13 into the film inlet opening Sd between the pressure plate 62 and mask plate 61. In this process, the output of L sensor 74 is switched from H to L as shown on the time chart in FIG. 21, because the film tip 96c passes thereby.

Figure 14:
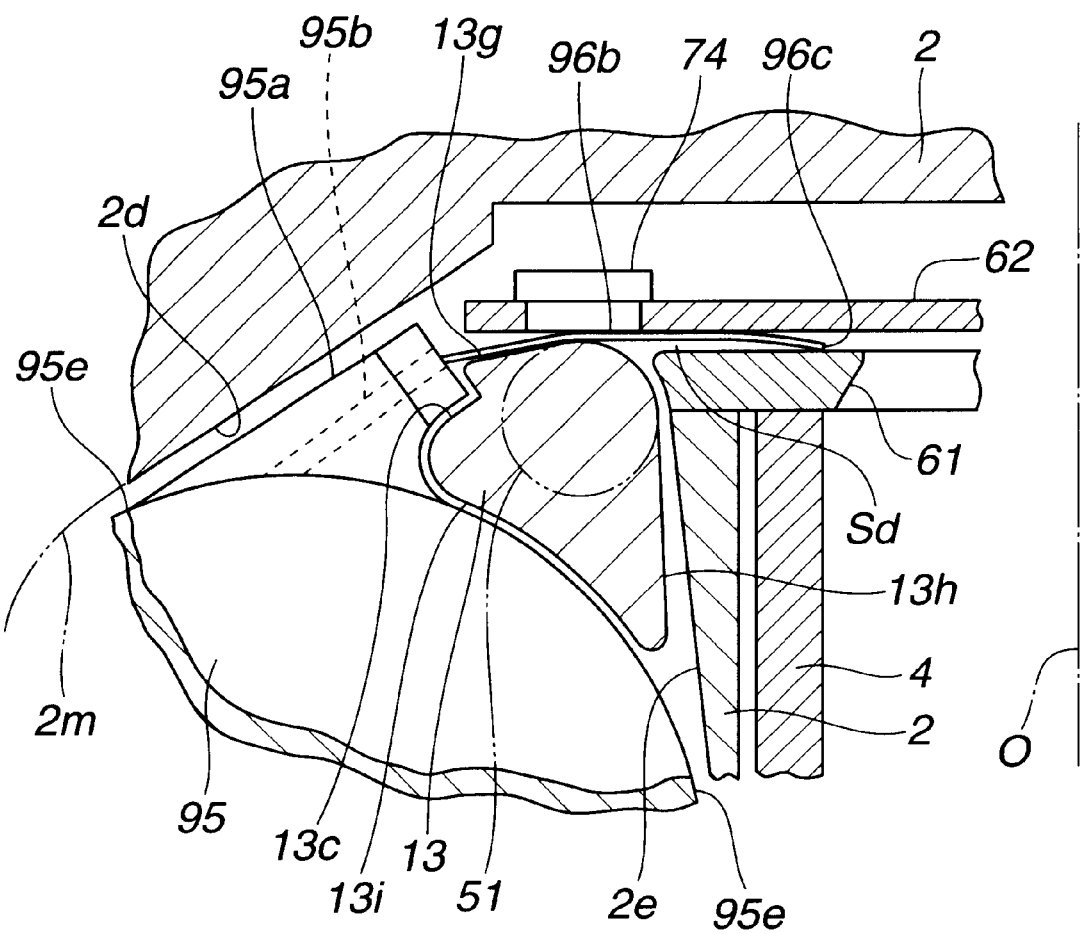
FIG. 14 is a partial expanded cross-sectional view of the surrounding of the film inlet opening and film guide after magazine loading in the camera of the embodiment illustrated by FIG. 1, as viewed from the camera upper surface, this view illustrating a state in which the film leader was fed into a gap (film supply path) between a pressure plate and a mask plate.

If the drive motor 72 continues rotating in the CCW direction, the tip 96c of film leader 96b passes through the film supply path between the pressure plate 62 and mask plate 61, as shown by a cross-sectional view in FIG. 14.

Figure 17:
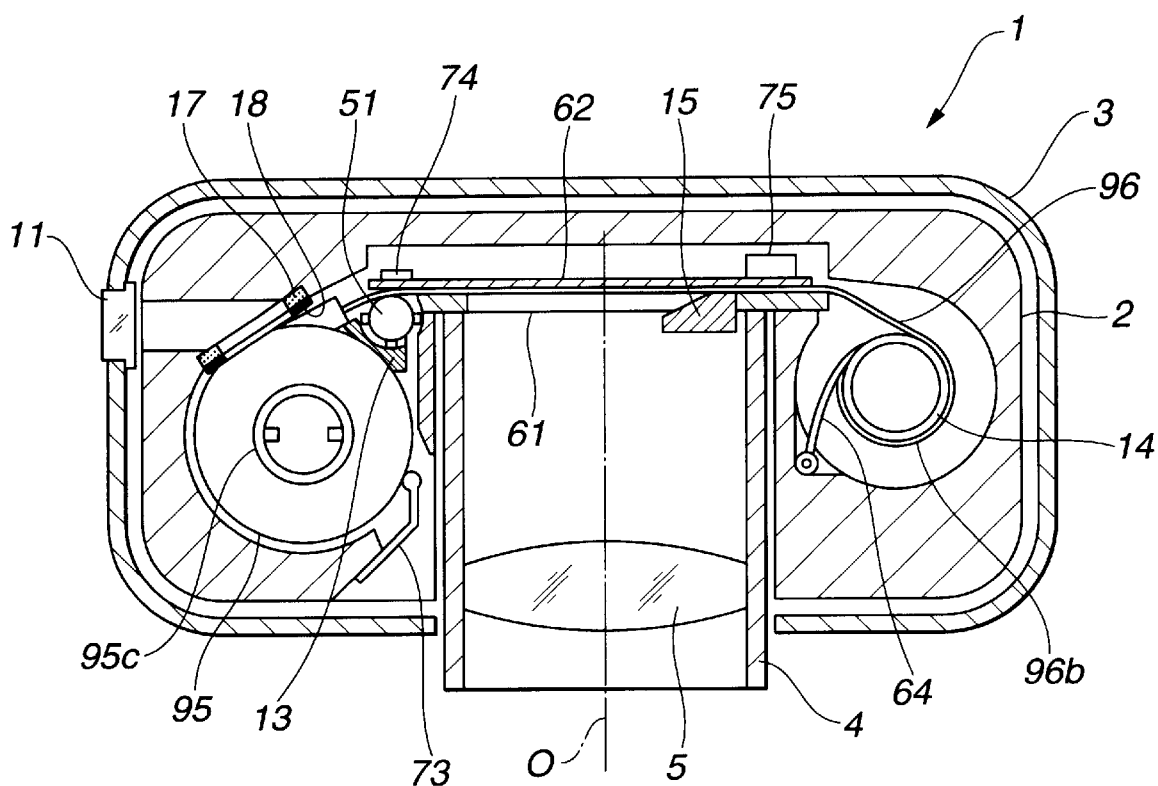
FIG. 17 is a lateral sectional view of the camera of the embodiment illustrated by FIG. 1, as viewed from the camera upper surface, this view illustrating a state in which the film leader is fed and wound onto a spool after the magazine loading.

If the film leader tip 96c then reaches the spool chamber 2b, the film leader 96b is wound on the spool 14 as shown by a cross-sectional view in FIG. 17. As a result, the film 96 is advanced at a speed of spool 14. The film supply speed determined by the spool 14 is set higher, as described above, than the speed at which the sprocket unit 51 is driven via the one-way clutch 32. Therefore, the film is advanced in a state in which the coupling of one-way clutch 32 was released.

In the above-described film feed process, after the film leader 96b has reached the position of P sensor 75 at the side of spool chamber, the P sensor 75 outputs a perforation passage pulse signal and the count of pulses is started in the counter 71d.

In step S7, the number of perforation passage pulses is checked. If the film 96 has been wound to a preset amount on spool 14 and the number of perforation passage pulses has reached the preset number of pulses Pb, a first frame of film 96 is considered to be set and autoloading of film 96 is completed. The rotation of drive motor 72 is terminated and the present routine is ended.

In the time chart shown in FIG. 21, the preset number of pulses Pb was reached and autoloading was ended at the point of time t4.

Once shooting of all frames in the loaded magazine 95 has been completed, or when the rewinding in-process state has been indicated by RWSW 87, if the drive motor 72 is rotated in the CW direction, the above-described rewinding state is assumed and film 96 is rewound into magazine 95.

If then the cover release knob 10 is operated and the magazine chamber cover 7 is released, the magazine 95 is ejected by the magazine removal spring 19 to a position in the magazine chamber opening from which it can be removed. Therefore, the removal of magazine can be conducted easily. At this time, since the film leader 96b is fully wound into magazine 95 and the engagement of sprocket catch 56 and perforation 96a is released, the magazine 95 can be removed from the magazine chamber 2a without any problem.

Furthermore, for example, when a magazine 95 that has not yet been used is inserted in magazine chamber 2a and then removed therefrom prior to autoloading, even though the perforation 96a is engaged with sprocket catch 56 during the removal, the perforation 96a applies pressure to the tilted surface 56b of sprocket catch during movement in the axial direction, causing the inward retraction of sprocket catch 56 and releasing the engagement. As a result, magazine 95 can be removed without any problem.

With the camera of the above-described embodiment, when magazine 95 is loaded, the loading can be conducted by simply lowering the magazine into the magazine chamber in a state in which the film leader is wound onto the magazine.

During the above-described magazine loading, the film leader 96b is reliably inserted between the cylindrical inner wall surface 2m of magazine chamber 2a and case 95e of magazine 95, while sliding over the film guide tilted surface 2c.

Furthermore, when the magazine is inserted or removed, the catch 56 of sprocket 51 for feeding is pushed by the lateral end surface of the film or by perforation and retracted into the sprocket tube. As a result, the film leader 96b can be smoothly and reliably inserted to the peripheral portion of sprocket 51 or removed therefrom.

Furthermore, when the magazine is inserted, the leader is guided by the film guide 13, which is a rotation blocking member controlling the rotation of magazine, and the film leader can be reliably inserted between the film guide 13 and magazine chamber cylindrical internal walls 2d, 2e. Furthermore, the magazine itself can be maintained in the preset position in a state in which the rotation thereof is controlled by film guide 13.

Further, during loading of the film after the magazine had been loaded, the sprocket unit 51, which is a feed mechanism of film guide 13 provided at the magazine chamber side, is rotated after the film leader was rewound. Because of the rotation of sprocket unit 51, the film leader 96b is smoothly fed from the film feed opening 95b to the film inlet opening Sd of the film supply path, while being guided by the wall surface of film guide 13, and then supplied into the spool chamber.

After the film has reached the spool chamber, advancing with the spool is executed and the loading is completed. Therefore, it is not necessary to rotate the magazine itself during loading, as in the conventional systems, and reliable autoloading can be executed.

Furthermore, as described above, since it is not necessary to rotate the magazine 95 during loading, the space taken by the film supply drive system or magazine chamber can be reduced and the dimensions of camera can be decreased.

Moreover, the magazine rotation mechanism becomes unnecessary and the cost of camera can be reduced.

Furthermore, the space in the magazine chamber 2a into which the feed opening protrusion 95a of magazine 95 is inserted is inclined at a preset angle to the plane perpendicular to the optical axis O. Therefore, the space taken by magazine chamber 2a in the left-right direction (lateral direction of camera) is decreased according to the degree of this inclination and the dimensions of camera can be reduced.

In the camera of the above-described embodiment, a sprocket unit 51 using a sprocket catch 56 was incorporated as a feed mechanism. However, a mechanism comprising a contact pressure roller can be employed instead of such feed mechanism. In this case, it is necessary that the contact pressure roller be retracted by the lateral end surface of the film leader when the film leader is inserted, or the contact pressure roller has to be retracted by the operation opening the magazine chamber cover.

Furthermore, in the above-described embodiment, the explanation was conducted with respect to a camera employing a 135-type film magazine as the magazine to be inserted. This magazine is an example, and the present invention can be also applied to any camera employing another type of film magazine in which the film leader is exposed.

What is claimed is:

1. A camera into which a magazine with a film tip exposed to the outside thereof is inserted, said camera comprising:
   a magazine chamber into which said magazine having said film tip wound thereon is inserted in the axial direction of a winding shaft; and
   a rod-like film guide which is disposed inside said magazine chamber and is inserted between said magazine and film tip that is exposed to the outside of said magazine when said magazine is loaded into said magazine chamber.

2. The camera according to claim 1, further comprising:
   a rewinding mechanism comprising a fork engageable with one end of the winding shaft of said magazine and driving said fork so as to wind said film tip into said magazine;
   a feed mechanism comprising a sprocket forming a part of said film guide and driving said sprocket so as to feed said film tip toward a spool;
   a wind-up mechanism comprising said spool disposed on the opposite side of the camera with respect to said magazine chamber so as to sandwich an aperture orifice therebetween and driving said spool so as to advance said film fed by the driving operation of said feed mechanism; and
   a control circuit for driving said rewinding mechanism so as to rewind a portion of said film tip into said magazine, terminating the rewinding operation after said film tip has been rewound to a preset position, and then driving said feed mechanism so as to feed said film tip toward said spool.

3. The camera according to claim 2, further comprising a loading detection mechanism for detecting that said magazine has been loaded into said magazine chamber, wherein said control circuit initiates said rewinding operation when loading is detected by said loading detection mechanism.

4. The camera according to claim 3, further comprising a cover detection switch for detecting that said magazine chamber has been closed with a cover covering said magazine chamber,. wherein said control circuit initiates said rewinding operation upon receiving signals from said cover detection switch and said loading detection mechanism.

5. The camera according to claim 2, further comprising a tip detection sensor for detecting the end portion of said film tip in the longitudinal direction thereof, wherein said control circuit terminates said rewinding operation based on the output of said tip detection sensor.

6. The camera according to claim 2, further comprising:
   a drive source for driving said rewinding mechanism, feed mechanism, and wind-up mechanism; and
   switching means for switching between a first state in which the drive power of said drive source is transmitted only to said rewinding mechanism and a second state in which the drive power of said drive source is transmitted to said feed mechanism and wind-up mechanism.

7. The camera according to claim 1, wherein said film guide comprises a sprocket having sprocket catches engageable with perforations of said film for film supply, said sprocket catches being pressed to the end surface of said film in the lateral direction thereof and retracted into said film guide when said magazine is loaded into said magazine chamber in said axial direction.

8. The camera according to claim 1, wherein said film guide is disposed in the vicinity of an inlet opening through which said film is fed from said magazine chamber toward an aperture orifice.

9. A camera into which a magazine with a film tip exposed to the outside thereof is inserted, said camera comprising:
   a magazine chamber into which said magazine having said film tip wound thereon is inserted in the axial direction of a winding shaft; and
   a rod-like film guide which is disposed inside said magazine chamber and is inserted between said magazine and film tip that is exposed to the outside of said magazine when said magazine is loaded into said magazine chamber;
   wherein said film guide comprises a position-controlling portion which controls said magazine such that said magazine is non-rotatable inside said magazine chamber.

10. A camera into which a magazine with a film tip exposed to the outside thereof is inserted, said camera comprising:
   a magazine chamber into which said magazine having said film tip wound thereon is inserted in the axial direction of a winding shaft;
   a rod-like film guide which is disposed inside said magazine chamber and is inserted between said magazine and film tip that is exposed to the outside of said magazine when said magazine is loaded into said magazine chamber;
   a rewinding mechanism comprising a fork engageable with one end of the winding shaft of said magazine and driving said fork so as to wind said film tip into said magazine;
   a feed mechanism comprising a sprocket forming a part of said film guide and driving said sprocket so as to feed said film tip toward a spool;
   a wind-up mechanism comprising said spool disposed on the opposite side of the camera with respect to said magazine chamber so as to sandwich a shooting orifice therebetween and driving said spool so as to advance said film fed by the driving operation of said feed mechanism;
   a control circuit for driving said rewinding mechanism so as to rewind a portion of said film tip into said magazine, terminating the rewinding operation after said film tip has been rewound to a preset position, and then driving said feed mechanism so as to feed said film tip toward said spool;

a drive source for driving said rewinding mechanism, feed mechanism, and wind-up mechanism; and switching means for switching between a first state in which the drive power of said drive source is transmitted only to said rewinding mechanism and a second state in which the drive power of said drive source is transmitted to said feed mechanism and wind-up mechanism;

wherein a one-way clutch is provided between said wind-up mechanism and said feed mechanism.

11. The camera according to claim 10, wherein said drive power is transmitted between said one-way clutch and said wind-up mechanism in said second state of said switching means.

12. A camera into which a magazine with a film tip exposed to the outside thereof is inserted, said camera comprising:

a magazine chamber into which said magazine having said film tip wound thereon is inserted in the axial direction of a winding shaft; and a rod-like film guide which is disposed inside said magazine chamber and is inserted between said magazine and film tip that is exposed to the outside of said magazine when said magazine is loaded into said magazine chamber;

wherein said film guide has a substantially triangular column shape.

13. A camera into which a magazine with a film tip exposed to the outside thereof is inserted, said camera comprising:

a magazine chamber into which said magazine having said film tip wound thereon is inserted in the axial direction of a winding shaft; and a rod-like film guide which is disposed inside said magazine chamber and is inserted between said magazine and film tip that is exposed to the outside of said magazine when said magazine is loaded into said magazine chamber;

wherein a tilted surface having a side of said loaded magazine as an apex is formed on the tip of said film guide.

14. A camera into which a magazine with a film tip exposed to the outside thereof is inserted, said camera comprising:

a magazine chamber into which said magazine having said film tip wound thereon is inserted in the axial direction of a winding shaft; and a rod-like film guide which is disposed inside said magazine chamber and is inserted between said magazine and film tip that is exposed to the outside of said magazine when said magazine is loaded into said magazine chamber;

wherein a surface tilted toward the inside of said magazine chamber is formed in the opening of said magazine chamber.

15. A camera using a magazine having a 135-type film, comprising:

a magazine chamber into which said magazine is inserted in the axial direction thereof in a state in which a film tip is exposed to the outside of the magazine and said film tip is wound on said magazine;

a magazine chamber cover for covering said magazine chamber;

a rewinding mechanism for driving the film exposed to the outside of said magazine in the direction of winding into said magazine;

a spool for advancing said film;

a wind-up mechanism for driving said spool;

film tip detection means disposed in the vicinity of the film outlet opening of said magazine, for detecting the tip edge of said film;

a film guide member disposed so as to be positioned between said magazine and film in a state in which said film is exposed to the outside of said magazine;

a feed mechanism for feeding the tip of said film to said spool;

loading detection means for detecting that said magazine has been loaded into said magazine chamber; and control means for driving said rewinding mechanism so as to rewind said film inside said magazine chamber upon reception of a signal from said loading detection means and for stopping said rewinding mechanism upon reception of a signal from said film tip detection means and then driving said feed mechanism for feeding said film to said spool.

16. The camera according to claim 15, further comprising a cover detection means for detecting that said magazine chamber cover has covered said magazine chamber, wherein said control means receives a signal from said cover detection means and said loading detection means and drives said rewinding mechanism so as to rewind said film in said magazine chamber.

17. A camera using a magazine having a 135-type film, comprising:

a magazine chamber into which said magazine is inserted in the axial direction thereof in a state in which a film tip is exposed to the outside of the magazine and said film tip is wound onto said magazine;

a rewinding mechanism for driving the film exposed to the outside of said magazine in the direction of winding into said magazine;

a spool for advancing said film;

a wind-up mechanism for driving said spool;

a film guide member disposed so as to be positioned between said magazine and film in a state in which said film is exposed to the outside of said magazine, conducting position control of said magazine in the rotation direction, and guiding the tip of said film; and a feed mechanism for feeding the tip of said film to said spool.

18. A camera using a magazine having a 135-type film, comprising:

a magazine chamber into which said magazine is inserted in the axial direction thereof in a state in which a film tip is exposed to the outside of the magazine and said film tip is wound on said magazine;

a rewinding mechanism for driving said film exposed to the outside of said magazine in the direction of winding into said magazine;

a spool for advancing said film;

a wind-up mechanism for driving said spool;

a feed mechanism for feeding the tip of said film to said spool;

a drive source for driving said rewinding mechanism, wind-up mechanism, and feed mechanism; and switching means for switching between a first state in which the drive power of said drive source is transmitted only to said rewinding mechanism and a second state in which the drive power of said drive source is transmitted to said wind-up mechanism and feed mechanism.

19. A camera into which a magazine having a film exposed from the feed opening thereof is inserted in the axial direction thereof, said camera comprising:

a magazine chamber for accommodating said magazine;

a film guide disposed inside said magazine chamber; and a sprocket having sprocket catches which are pressed to the end surface of said film in the lateral direction thereof and retracted into said film guide when said magazine is loaded into said magazine chamber in the direction of an axis of a winding shaft of said magazine.

20. The camera according to claim 19, wherein said sprocket is provided inside said magazine chamber.

21. The camera according to claim 20, wherein said sprocket is provided between the feed opening and an aperture orifice and feeds said film into a film gate located at the front end of said aperture orifice in the vicinity of said sprocket.

22. The camera according to claim 20, wherein said sprocket catches are moved in the direction perpendicular to said axial direction under the effect of a force parallel to the axial direction of said sprocket or a force in the direction perpendicular to said axial direction.

23. The camera according to claim 20, wherein said sprocket catches can be engaged with perforations of said film and are retracted from said perforation when said magazine is removed from said magazine chamber.

24. A camera comprising:

a lens barrel;

a magazine chamber for loading a magazine in a state in which a film exposed from the magazine is wound onto the magazine, said magazine chamber being disposed at a side of said lens barrel and having an axis thereof disposed parallel to a plane perpendicular to an optical axis of said lens barrel;

a film rail surface provided behind said lens barrel;

a film pressure plate;

an inlet opening for introducing said film between said film rail surface and said film pressure plate; and a feed mechanism provided in the magazine chamber for feeding the film exposed from said magazine into said inlet opening, said feed mechanism being provided in a space bounded by said lens barrel, peripheral outer surface of said magazine, and a line connecting the film feed opening of said magazine with said inlet opening.

25. The camera according to claim 24, wherein said space has a substantially triangular column shape.

26. The camera according to claim 24, wherein a position setting member is disposed in said space for controlling the position of the film feed opening of said magazine and setting the position of said magazine in the rotation direction.

27. The camera according to claim 24, wherein said feed mechanism has a sprocket or a roller for feeding said film.

28. A camera into which a film magazine can be loaded, said magazine comprising a winding shaft onto which a film is wound and having a film leader exposed from a feed opening, said camera comprising:

a magazine chamber into which said film magazine can be loaded in the direction of said winding shaft; and a rotation blocking member provided inside said magazine chamber and capable of controlling the rotation of said film magazine about said winding shaft of said film magazine, said rotation blocking member comprising a film leader guide capable of guiding said film leader.

29. The camera according to claim 28, further comprising:

a lens barrel disposed at a side of said magazine chamber;

a film rail surface provided behind said lens barrel;

a film pressure plate; and an inlet opening for introducing said film between said film pressure plate and film rail surface, wherein in a state in which said film magazine is loaded into said magazine chamber, said film leader guide is capable of guiding said film leader from said feed opening to said inlet opening.

30. A camera into which a film magazines can be loaded, said magazine comprising a winding shaft onto which a film is wound and having a film leader exposed from a feed opening, said camera comprising:

a magazine chamber into which said film magazine can be loaded in the direction of said winding shaft; and a rotation blocking member provided inside said magazine chamber and capable of controlling the rotation of said film magazine about said winding shaft of said film magazine, said rotation blocking member comprising a film leader guide capable of guiding said film leader;

wherein said film leader guide is formed by a tilted surface having one end portion of said rotation blocking member as an apex, and when said film magazine is loaded into said magazine chamber in a state in which said film leader is wound around the periphery thereof, said film leader can be guided so that said film leader is inserted between said rotation blocking member and said magazine chamber inner wall.

31. A camera into which a film magazine can be loaded, said magazine comprising a winding shaft onto which a film is wound and having a film leader pulled out from a feed opening, said camera comprising:

a magazine chamber comprising an opening into which said film magazine can be loaded in a state in which said film leader is wound onto said film magazine, a cylindrical inner wall corresponding to the cylindrical portion of said film magazine, a first feed opening wall formed corresponding to the feed opening portion of said film magazine continuously with said cylindrical inner wall, and a second feed opening wall formed so as to form a substantially V-shape with said first feed opening wall continuously with said cylindrical inner wall; and a rotation blocking member provided between said first feed opening wall and second feed opening wall and capable of controlling the rotation of said film magazine about said winding shaft, a film leader guide being provided on one end of said rotation blocking member.

32. A camera into which a film magazine can be loaded, said magazine comprising a winding shaft onto which a film is wound and having a film leader pulled out from a feed opening, said camera comprising:

a magazine chamber comprising an opening into which said film magazine can be loaded in a state in which said film leader is wound onto said film magazine, a cylindrical inner wall corresponding to the cylindrical portion of said film magazine, a first feed opening wall formed corresponding to the feed opening portion of said film magazine continuously with said cylindrical inner wall, and a second feed opening wall formed so as to form a substantially V-shape with said first feed opening wall continuously with said cylindrical inner wall; and a rotation blocking member provided between said first feed opening wall and second feed opening wall and capable of controlling the rotation of said film magazine about said winding shaft, a film leader guide being provided on one end of said rotation blocking member;

wherein said film leader guide is a tilted surface formed such that said film leader is inserted from between said first feed opening wall and said rotation blocking member and through the gap between said second feed opening wall and said rotation blocking member.

33. A camera into which a film magazine can be loaded, said magazine comprising a winding shaft onto which a film is wound and having a film leader exposed from a feed opening, said camera comprising:

a lens barrel;

a film rail surface provided behind said lens barrel;

a film pressure plate;

an inlet opening for introducing said film between said film pressure plate and said film rail surface;

a magazine chamber into which said film magazine can be loaded; and a rotation blocking member provided inside said magazine chamber and capable of controlling the rotation of said film magazine about said winding shaft, wherein a first film leader guide capable of guiding said film leader from a feed opening portion where said feed opening is provided to said inlet opening in a state in which said film magazine is loaded in said magazine chamber is provided at one end portion of said rotation blocking member, and a second film leader guide capable of guiding said film leader between said magazine chamber inner wall and said rotation blocking member is provided at a part of said rotation blocking member.

34. A camera into which a film magazine can be loaded, said magazine comprising a winding shaft onto which a film is wound and having a film leader exposed from a feed opening, said camera comprising:

a magazine chamber having an orifice into which said film magazine can be inserted in the direction of said winding shaft in a state in which said film leader is wound along the outer peripheral surface of said film magazine; and a guide which can guide said film leader provided in said orifice into said magazine chamber.

35. A camera into which a film magazine can be loaded, said magazine comprising a winding shaft onto which a film is wound and having a film leader exposed from a feed opening, said camera comprising:

a magazine chamber having an orifice into which said film magazine can be inserted in the direction of said winding shaft in a state in which said film leader is wound along the outer peripheral surface of said film magazine; and a guide which can guide said film leader provided in said orifice into said magazine chamber;

wherein said guide is a tilted surface formed by a concave conical surface inclined toward the vicinity of the center of said winding shaft formed in said orifice and is formed along an extension direction of said film leader from the vicinity of the position corresponding to the film feed opening unit.

36. The camera according to claim 35, comprising a rotation blocking member provided inside said magazine chamber and capable of controlling the rotation of said film magazine about said winding shaft, said guide being capable of guiding said film leader so that said film leader is inserted and passed between said rotation blocking member and said film magazine inner wall when said film magazine is loaded into said magazine chamber.

37. A camera into which a film magazine can be loaded, said magazine comprising a winding shaft onto which a film is wound and having a film leader exposed from a feed opening, said camera comprising:

a magazine chamber into and from which said film magazine can be inserted and removed in the direction of said winding shaft; and a rotation blocking member provided inside said magazine chamber so as to define a predetermined gap with the side wall of said magazine chamber and capable of controlling the rotation of said film magazine around said winding shaft of said film magazine, wherein said film leader is inserted into the gap between the side wall of said magazine chamber and said rotation blocking member when said film magazine is loaded into said magazine chamber.

38. The camera as described in claim 37, wherein said rotation blocking member is arranged in a space of a substantially triangular column shape formed by said feed opening, a cylindrical portion of said film magazine, and the side wall of said magazine chamber.

39. A camera into which a film magazine can be loaded, said magazine comprising a winding shaft onto which a film is wound and having a film leader exposed from a feed opening, said camera comprising:

a magazine chamber into which said film magazine can be loaded and which defines a cylindrical space corresponding to the cylindrical portion of said film chamber and a space of a triangular column shape corresponding to a feed opening portion of said film magazine continuously with said cylindrical space;

a rotation blocking member having a substantially triangular column shape, which is disposed in said space of triangular column shape and capable of controlling the rotation of said film magazine about said winding shaft, wherein said rotation blocking member is positioned between said film leader and said film magazine when said film magazine is loaded.

* * * * *